(12) United States Patent
Heineck et al.

(10) Patent No.: US 9,955,536 B2
(45) Date of Patent: Apr. 24, 2018

(54) CUSTOMIZED MICROWAVE ENERGY DISTRIBUTION UTILIZING SLOTTED CAGE

(71) Applicant: Nike, Inc., Beaverton, OR (US)

(72) Inventors: David Heineck, Tigard, OR (US); Zakaryae Fathi, Raleigh, NC (US)

(73) Assignee: NIKE, INC., Beaverton, OR (US)

( * ) Notice: Subject to any disclaimer, the term of this patent is extended or adjusted under 35 U.S.C. 154(b) by 1215 days.

(21) Appl. No.: 13/841,674

(22) Filed: Mar. 15, 2013

(65) Prior Publication Data
US 2014/0263294 A1    Sep. 18, 2014

(51) Int. Cl.
| | |
|---|---|
| H05B 6/64 | (2006.01) |
| H05B 6/70 | (2006.01) |
| A43D 25/20 | (2006.01) |
| H05B 6/78 | (2006.01) |
| H05B 6/80 | (2006.01) |
| A43B 9/12 | (2006.01) |
| B29C 35/08 | (2006.01) |
| B29C 65/14 | (2006.01) |
| B29C 65/00 | (2006.01) |
| B29L 31/50 | (2006.01) |

(52) U.S. Cl.
CPC ............... H05B 6/70 (2013.01); A43B 9/12 (2013.01); A43D 25/20 (2013.01); B29C 35/0805 (2013.01); B29C 65/1425 (2013.01); B29C 66/1122 (2013.01); B29C 66/45 (2013.01); H05B 6/708 (2013.01); H05B 6/78 (2013.01); H05B 6/80 (2013.01); B29C 66/71 (2013.01); B29C 2035/0855 (2013.01); B29L 2031/504 (2013.01)

(58) Field of Classification Search
CPC .......... H05B 6/70; H05B 6/707; H05B 6/708; B29C 2035/0855; B29C 35/0805; B29C 65/1425; B29C 51/10; A43D 25/20
USPC ........................................................ 219/756
See application file for complete search history.

(56) References Cited

U.S. PATENT DOCUMENTS

| | | | |
|---|---|---|---|
| 2,441,097 A | 5/1948 | Hicks | |
| 2,742,390 A | 4/1956 | Beck | |
| 3,151,519 A * | 10/1964 | Phipard, Jr. ............ | B21K 1/463 411/404 |

(Continued)

FOREIGN PATENT DOCUMENTS

| | | |
|---|---|---|
| CN | 1069691 A | 3/1993 |
| DE | 01963711 | 7/1971 |

(Continued)

OTHER PUBLICATIONS

International Search Report with Written Opinion dated Aug. 26, 2014 in Application No. PCT/US2014/027301, 12 pages.

(Continued)

*Primary Examiner* — Dana Ross
*Assistant Examiner* — James Sims, III
(74) *Attorney, Agent, or Firm* — Shook Hardy & Bacon, LLP

(57) ABSTRACT

Aspects of the present invention relate to systems and methods for customizing microwave energy distribution within a chamber to accommodate various load characteristics. Aspects of the present invention customized configurations of ports, deflectors, waveguides, conducting rods, and slots to shape and distribute energy.

16 Claims, 27 Drawing Sheets

(56) References Cited

U.S. PATENT DOCUMENTS

| | | | |
|---|---|---|---|
| 3,164,834 A | 1/1965 | Nikolayuk | |
| 3,458,808 A | 7/1969 | Agdur | |
| 3,471,352 A | 10/1969 | Brooke | |
| 3,594,667 A * | 7/1971 | Mann | H01P 1/08 333/251 |
| 3,611,135 A | 10/1971 | Margerum | |
| 3,612,803 A | 10/1971 | Klaas | |
| 3,619,252 A | 11/1971 | Roscher | |
| 3,620,875 A | 11/1971 | Guglielmo | |
| 3,620,876 A | 11/1971 | Guglielmo | |
| 3,769,133 A | 10/1973 | Nuding | |
| 3,888,715 A | 6/1975 | Fraser | |
| 3,917,503 A | 11/1975 | Tamura | |
| 3,941,641 A | 3/1976 | Heller | |
| 3,964,961 A | 6/1976 | Kremer | |
| 4,035,547 A | 7/1977 | Heller | |
| 4,067,765 A | 1/1978 | Heller | |
| 4,106,969 A | 8/1978 | Puyplat | |
| 4,120,712 A | 10/1978 | Sindt | |
| 4,144,468 A | 3/1979 | Mourier | |
| 4,176,268 A | 11/1979 | Gerling | |
| 4,180,426 A | 12/1979 | Oustin | |
| 4,185,181 A | 1/1980 | Kaneko et al. | |
| 4,196,332 A | 4/1980 | Mackay | |
| 4,329,557 A * | 5/1982 | Staats | H05B 6/6402 219/745 |
| 4,340,796 A | 7/1982 | Yamaguchi | |
| 4,370,189 A | 1/1983 | Siedenstrang et al. | |
| 4,381,602 A | 5/1983 | Mciver | |
| 4,415,789 A | 11/1983 | Nobue | |
| 4,425,406 A | 1/1984 | Palma | |
| 4,454,619 A | 6/1984 | Bichet | |
| 4,456,598 A | 6/1984 | Growden | |
| 4,464,554 A | 8/1984 | Bakanowski et al. | |
| 4,499,356 A | 2/1985 | Hatagawa | |
| 4,504,718 A | 3/1985 | Okatsuka | |
| 4,554,347 A | 11/1985 | Hawkes | |
| 4,568,262 A | 2/1986 | Feurer | |
| 4,593,167 A | 6/1986 | Nilssen | |
| 4,601,772 A | 7/1986 | McKelvey | |
| 4,626,642 A | 12/1986 | Wang | |
| 4,653,855 A | 3/1987 | Birnbach | |
| 4,684,777 A | 8/1987 | Eves | |
| 4,707,402 A | 11/1987 | Thorsrud | |
| 4,733,165 A | 3/1988 | Richardson | |
| 4,825,028 A | 4/1989 | Smith | |
| 4,839,588 A | 6/1989 | Jantsch | |
| 4,843,202 A | 6/1989 | Smith | |
| 4,855,553 A | 8/1989 | Minobe | |
| 4,859,268 A | 8/1989 | Joseph | |
| 4,866,344 A | 9/1989 | Ross | |
| 4,869,767 A | 9/1989 | Robinson | |
| 4,880,486 A | 11/1989 | Maeda | |
| 4,904,928 A | 2/1990 | Lewis | |
| 4,906,497 A | 3/1990 | Hellmann | |
| 4,939,331 A | 7/1990 | Berggren | |
| 4,959,614 A | 9/1990 | Bowling | |
| 4,969,968 A | 11/1990 | Leatherman | |
| 5,039,947 A | 8/1991 | Kraszewski | |
| 5,072,087 A | 12/1991 | Apte | |
| 5,108,532 A | 4/1992 | Thein | |
| 5,120,176 A | 6/1992 | Bhatia | |
| 5,129,977 A | 7/1992 | Leatherman | |
| 5,166,203 A | 11/1992 | Stecker | |
| 5,182,134 A | 1/1993 | Sato | |
| 5,222,543 A | 6/1993 | Carlstrom | |
| 5,232,748 A | 8/1993 | Horowitz | |
| 5,240,542 A | 8/1993 | Miller | |
| 5,241,040 A | 8/1993 | Cuomo | |
| 5,242,634 A | 9/1993 | Matsumoto et al. | |
| 5,254,197 A | 10/1993 | Klems | |
| 5,254,824 A | 10/1993 | Chamberlain | |
| 5,272,216 A | 12/1993 | Clark | |
| 5,291,212 A | 3/1994 | Cox | |
| 5,296,074 A | 3/1994 | Graham | |
| 5,296,271 A | 3/1994 | Swirbel | |
| 5,304,766 A | 4/1994 | Baudet et al. | |
| 5,317,081 A | 5/1994 | Gelorme | |
| 5,321,222 A | 6/1994 | Bible | |
| 5,324,345 A | 6/1994 | Rutjes | |
| 5,328,539 A | 7/1994 | Sato | |
| 5,338,611 A | 8/1994 | Jean | |
| 5,342,659 A | 8/1994 | Horowitz | |
| 5,366,573 A | 11/1994 | Bayer | |
| 5,378,298 A | 1/1995 | Williams | |
| 5,397,993 A | 3/1995 | Tews | |
| 5,400,460 A | 3/1995 | Roeker | |
| 5,421,789 A | 6/1995 | Gregg | |
| 5,433,804 A | 7/1995 | Nottingham | |
| 5,457,303 A | 10/1995 | Shute et al. | |
| 5,462,627 A | 10/1995 | Oldham | |
| 5,804,801 A | 9/1998 | Lauf | |
| 6,087,642 A | 7/2000 | Joines et al. | |
| 6,107,614 A | 8/2000 | Linn et al. | |
| 6,175,337 B1 * | 1/2001 | Jasper, Jr. | H01Q 21/0043 343/770 |
| 6,297,479 B1 | 10/2001 | Wefers | |
| 6,301,191 B1 | 10/2001 | Waycuilis | |
| 6,312,548 B1 | 11/2001 | Fathi et al. | |
| 6,402,877 B1 | 6/2002 | Bielfeldt | |
| 6,497,786 B1 | 12/2002 | Kilgore et al. | |
| 6,546,646 B1 | 4/2003 | Thomas | |
| 6,995,724 B2 | 2/2006 | Teshirogi et al. | |
| 7,507,938 B2 * | 3/2009 | McFadden | A21B 1/245 219/400 |
| 8,149,177 B1 | 4/2012 | Callus et al. | |
| 8,186,076 B2 | 5/2012 | Takagi | |
| 2002/0139795 A1 | 10/2002 | Araya et al. | |
| 2003/0051372 A1 | 3/2003 | Lyden | |
| 2003/0224082 A1 | 12/2003 | Akopyan | |
| 2004/0226648 A1 | 11/2004 | Gupte et al. | |
| 2005/0127066 A1 | 6/2005 | Youm et al. | |
| 2005/0199619 A1 * | 9/2005 | Richardson | B65D 15/14 219/728 |
| 2006/0054618 A1 | 3/2006 | Agrawal et al. | |
| 2009/0236030 A1 | 9/2009 | Marc | |
| 2011/0232008 A1 | 9/2011 | Crisp | |
| 2012/0313832 A1 | 12/2012 | Pazin et al. | |

FOREIGN PATENT DOCUMENTS

| | | |
|---|---|---|
| DE | 3930352 | 3/1991 |
| EP | 0060377 | 9/1982 |
| EP | 0496684 A1 | 7/1992 |
| EP | 0705682 | 4/1996 |
| FR | 1078014 | 11/1954 |
| FR | 2570580 | 3/1986 |
| FR | 2669557 A1 | 5/1992 |
| GB | 1326292 | 8/1973 |
| GB | 2081559 A | 2/1982 |
| GB | 2240980 | 8/1991 |
| JP | 08070911 A | 5/1997 |
| JP | 09128823 A | 5/1997 |
| WO | 0006526 | 11/1987 |
| WO | 0036728 | 10/1997 |
| WO | 0036965 | 10/1997 |
| WO | 9924498 A2 | 5/1999 |

OTHER PUBLICATIONS

International Preliminary Report on Patentability dated Sep. 24, 2015 in Application No. PCT/US2014/027301, 11 pages.
International Preliminary Report on Patentability dated Sep. 24, 2015 in Application No. PCT/US2014/024387, 10 pages.
International Preliminary Report on Patentability dated Sep. 24, 2015 in Application No. PCT/US2014/024395, 11 pages.
International Preliminary Report on Patentability dated Sep. 24, 2015 in Application No. PCT/US2014/024416, 8 pages.
International Preliminary Report on Patentability dated Sep. 24, 2015 in Application No. PCT/US2014/024372, 8 pages.
Notice of Allowance dated Oct. 28, 2015 in U.S. Appl. No. 13/841,585, 8 pages.

(56) References Cited

OTHER PUBLICATIONS

International Search Report with Written Opinion dated Jul. 1, 2014 in PCT/US14/24387, 12 pages.
International Search Report with Written Opinion dated Jul. 7, 2014 in PCT/US14/24395, 13 pages.
International Search Report with Written Opinion dated Jul. 7, 2014 in PCT/US14/24372, 10 pages.
International Search Report with Written Opinion dated Jul. 8, 2014 in PCT/US14/24416, 9 pages.
PCT International Search Report, International Application No. PCT/US98/23907.
Patent Abstracts of Japan, vol. 096, No. 007, Jul. 31, 1996, and JP 08 070911A Mar. 19, 1996.
Patent Abstracts of Japan, vol. 1997, No. 09, Sep. 30, 1997, and JP 09 128823A May 16, 1997, and U.S. Pat. No. 5,779,855A Jul. 14, 1998.
Bible et al., Multikilowatt Variable Frequency Microwave Furnace (Apr. 1992), 4 pgs.
Rudder et al., Diamond Chemical Vapor Deposition (CVD) via Microwave-Excited Plasma From Water-Ethanol Solutions (Apr. 1993) pp. 377-384.
Johnson et al., Use of a Variable Frequency Microwave Furnace for Large-Area, Uniform Processing (Apr. 1993) pp. 563-570.
Lauf et al., Materials Processing Using a Variable Frequency Microwave Furnace (Apr. 1993) pp. 571-579.
Lauf et al., 2 to 18 GHz Broadband Microwave Heating Systems (Nov. 1993) 4 pgs.
Johnson et al., Effect of Bandwidth on Uniformity of Energy Distribution in a Multi-Mode Cavity (Apr. 1994) 6 pgs.
Demeuse et al., Variable Frequency Microwave Processing of Thermoset Polymer Matrix Composites (Apr. 1994) 6 pgs.
Johnson et al., Use of Variable Frequency Microwave Energy as a Flexible Plasma Tool (Apr. 1994) 6 pgs.
Demeuse et al., Microwave Processing of Isocyanate/Epoxy Composites (May 1994) 12 pgs.
Non-Final Office Action dated Mar. 17, 2016 in U.S. Appl. No. 13/841,783, 14 pages.
European Search Report dated Jul. 19, 2016 for European Patent Application No. 14768255.3 9 pages.
Non-Final Office Action dated Feb. 13, 2015 in U.S. Appl. No. 13/841,585, 9 pages.
European Partial Search Report dated Nov. 25, 2016 for European Patent Application No. 14768052.4, 7 Pages.
Non-Final Office Action dated Sep. 15, 2016 in U.S. Appl. No. 13/841,884, 16 pages.
European Search Report Dated Oct. 6, 2016 for European Patent Application No. 14768618.2, 7 pages.
European Search Report Dated Oct. 10, 2016 for European Patent Application No. 14768973.1, 6 pages.
European Search Report Dated Oct. 19, 2016 for European Patent Application No. 14767566.4, 8 pages.
Final Office Action dated Dec. 22, 2016 in U.S. Appl. No. 13/841,783, 15 pages.
Non-Final Office Action dated Jan. 11, 2017 in U.S. Appl. No. 14/209,208, 19 pages.
Notice of Allowance dated May 24, 2017 in U.S. Appl. No. 13/841,783, 12 pages.
Final Office Action dated Jul. 11, 2017 in U.S. Appl. No. 13/841,884, 17 pages.
Final Office Action dated Aug. 22, 2017 in U.S. Appl. No. 14/209,208, 21 pages.
European Search Report dated Mar. 16, 2017 in European Patent Application No. 14768052.4, 9 pages.
Non-Final Office Action dated Dec. 12, 2017 in U.S. Appl. No. 13/841,884, 15 pages.

* cited by examiner

US 9,955,536 B2

CUSTOMIZED MICROWAVE ENERGY DISTRIBUTION UTILIZING SLOTTED CAGE

BACKGROUND OF THE INVENTION

Shoes and similar items are often constructed from smaller parts made from rubber, foams, or other materials that require curing. Often, such parts are irregularly shaped and/or composed of more than one type of material. Curing irregularly shaped parts and/or parts made from different types of materials through the application of heat can be challenging, as attaining the desired temperature for different portions of a part with differing thicknesses and/or made of different materials can be difficult with traditional heating methods. Traditional heating methods for curing parts may use an oven, a heat press, or similar approaches to heat a part for a curing process. In addition to the difficulties of using ovens, heat presses, and the like to cure shoe parts due to energy distribution limitations, these methods also can be inefficient in their use of energy.

BRIEF SUMMARY OF THE INVENTION

The present invention generally relates to systems and methods for customizing a distribution of microwave energy within a chamber to uniformly process a non-uniform workload, such as a shoe part.

Systems and methods in accordance with the present invention provide a variety of approaches to manipulate the distribution of microwave energy within a chamber retaining a part to be cured. The chamber itself may be only slightly larger than the part to be cured. The chamber may be constructed of a conducting material that does not permit microwave energy to enter from the outside of the chamber to the inside of the chamber. Microwave entry points may be provided to permit microwave energy to enter the chamber at only selected locations relative to a part to be cured retained within the chamber. Such microwave entry points may be ports that connect to a waveguide that delivers microwave energy from a source to a chamber. The shape, size, and orientation of such a port may be selected to attain a desired distribution of microwave energy within the chamber, either alone or in combination with other features in accordance with the present invention. Microwave entry points may alternatively/additionally comprise openings in the chamber that permit microwaves ambiently present around the chamber to selectively enter the chamber. Microwaves may be ambiently present around a chamber if, for example, the chamber has been placed into a larger microwave applicator chamber, such as a continuous feed microwave oven.

Microwave heating has been used in food processing and other industries to attain rapid and energy efficient heating of items. However, traditional systems and methods in microwave art do not provide customized energy distribution necessary to uniformly process a non-uniform workload such as encountered by a shoe part to be cured. Traditional systems and methods are particularly disadvantageous when working with small chambers of a size required for a typical shoe part, as the traditional systems and methods applied to a small chamber may facilitate a blow torch effect. A blow torch effect is an effect of an intense amount of energy being concentrated on a specific portion of a material and the energy dissipating prior to reaching other portions of the material. Specifically, a blow torch effect may cause for a specific portion of material closest to a port to cure while leaving portions farther away from the port to remain uncured. The blow torch effect does not allow for materials to be uniformly cured.

Within a chamber in accordance with the present invention, a part to be cured, which may be referred to as a "load" or a "workload," may be retained within one or more dielectric materials. The dielectric material may provide a cavity that retains the part to be cured and, if desired, to provide shape, textures, etc., to the part as it is heated. Multiple types of dielectrics may be used at different locations within a chamber. The use of different types of dielectric materials may alter the distribution of the microwave energy, effectively refracting the microwaves, but also may generate differing amounts of heat based upon the interactions of the dielectric with the applied microwave energy. For example, a more "lossy" dielectric will heat more under applied microwave energy than a less "lossy" dielectric. By selecting the type, amount, and orientation of different types of dielectrics within a chamber, both the distribution of microwave energy and heat within the chamber may be selected.

Additional elements may be used to achieve a desired microwave distribution within a chamber. For example, a conducting deflector may prevent the over-curing of the portion of a part immediately aligned with a microwave entry point. Other distribution plates may guide microwave energy to portions of the chamber where the energy is desired and/or away from portions of the chamber where microwave energy is not desired. By way of further example, a conducting rod extending through the wall of a chamber may transmit microwave energy from outside of the chamber into the chamber, and then may further distribute the microwave energy in a more desirable pattern within the chamber.

Further, because many curing processes require or benefit from the application of pressure, systems and methods in accordance with the present invention may apply pressure to the part to be cured within the chamber. Dielectrics may be selected that transmit applied pressure to a part within a cavity formed within the dielectric(s). The walls of a chamber itself may be designed either to secure under a desired amount of pressure, for example when latched or otherwise secured into a closed position, or to transmit pressure applied from an external source, such as a conventional press.

Aspects of the present invention configure ports, deflectors, distribution plates, waveguides, and conducting rods to tune microwave energy based on characteristics of the non-uniform workload. In this fashion, the distribution of microwave energy may be selected so as to achieve a desired amount of curing at all locations of a shoe part, which may require the application of the same or different amounts of energy to the shoe part. Systems and methods in accordance with the present invention may be used to cure parts intended for finished products other than shoes, although parts for shoes are described in conjunction with some examples herein. Further, any type of material requiring or benefiting from curing or other processing by heating may be processed using systems and/or methods in accordance with the present invention.

Aspects of the present invention may be particularly useful in curing a shoe sole. Generally, a shoe sole is shaped in a non-uniform manner. For instance, a heel portion of a shoe sole may have a shorter width than a ball portion of a shoe sole. Further, as described further below, during a curing process a volume of the shoe sole material may vary from the heel portion to the ball portion. Customizing the energy distribution throughout a chamber allows for the shoe sole to be cured uniformly despite the non-uniform shape and various other non-uniform characteristics.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1A:
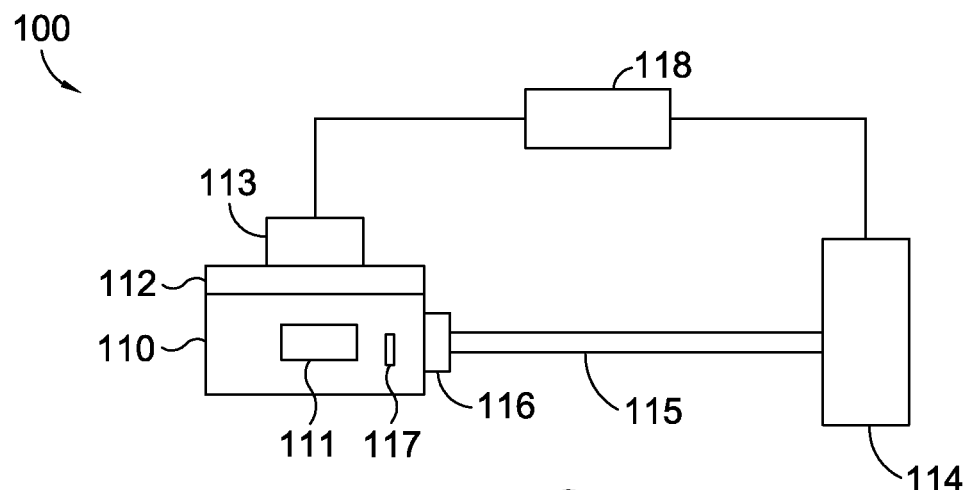
FIG. 1A is an exemplary microwave system used in various aspects of the present invention.

Shoe construction in general, and the construction of athletic shoes in particular, can present a challenge due to the diversity of materials used in the construction of the shoes. Different types of materials may require different processing techniques to form into individual components, and further may be difficult to join together to create a fully assembled shoe. One particular example of these challenges of differing types of materials in a typical athletic shoe may be found in the sole section of a shoe. The outsole of a shoe may typically be formed from a rubber or other durable material that may withstand contact with the ground, floor, or other surface during wear. The midsole of a typical shoe, on the other hand, may often be formed from a different material such as a foam type of material, like for example, ethylene-vinyl acetate (EVA) foam, sometimes to referred to as phylon. While other types of materials may be used to form an outsole and a midsole than these examples, in general the different purposes of an outsole, to provide reliable contact with a surface, and a midsole, to provide cushioning for the feet of a wearer, results in these different sole components being constructed from different types of materials. In examples herein, a first material, such as rubber, and a second material, such as EVA foam, may be cured and/or joined. The term "EVA" will be used as shorthand for the wide range of materials, formulations, and blends of materials that may be used to form a shoe midsole, even though in some instances those materials may not comprise ethylene-vinyl acetate in their entirety or even in part.

The use of different types of materials, such as rubbers and EVA, for different portions of a sole assembly in an athletic shoe, requires specialized equipment and methodologies to prepare each of those components individually. Ultimately, after each component has been prepared, an adhesive capable of bonding to both materials will typically be used to engage them together. While both rubber and EVA, in the present example, may typically be formed into a shoe part via heating and/or the application of pressure, the amount of heat required, the length of time maintained at a given temperature, and the amount of pressure required may differ markedly for an EVA material and a rubber material. Complicating matters further, different regions of a midsole and/or an outsole may benefit from a different amount, duration, heat and/or pressure provided to obtain optimal curing due to, for example, different thicknesses of the material at different places on the sole assembly of a shoe. By way of further example, the heal portion of a shoe intended for running may often be thicker when measured from top to bottom in an as-worn orientation than a portion of the midsole associated with the forefoot, making it desirable to apply more heat to the heel portion of the midsole than to the forefoot of the midsole during curing. Unfortunately, such localized distribution of heat energy to a shoe part is not readily attainable with the conventional equipment of an oven and/or heat press.

Even after different components of a shoe, such as a midsole and an outsole have been prepared appropriately based upon the differing materials used, those two components may be still be assembled to produce the final shoe product. This process typically involves the use of adhesives, which add cost and potential waste to the shoe manufacturing process, but which also provide a potential point of failure for the completed shoe. For example, an inadequate or irregular application of an adhesive to a midsole and an outsole may result in an improper joining of the two, leading to the outsole and midsole to partially or entirely separate after some amount of use. Obviously, such a failure is undesirable on the part of both the manufacturer and ultimate user of the shoe.

The present invention overcomes the challenges of preparing and ultimately affixing components made from different materials in the assembly of a shoe through the customized distribution of microwave energy through a shoe part. The use of microwave energy to generate some or all of the heat required to properly cure a shoe part, for example a part made of rubber and/or EVA, may be difficult due to the irregular distribution of microwave energy from most microwave applicators. For example, the experience of having a hot spot and/or a cold spot in a food dish being warmed in a microwave oven is one instance of these hot spots and cold spots. While hot spots and cold spots may be annoying when warming food, they can be catastrophic in forming a shoe or shoe part. For example, an inadequate curing of a part may lead to the parts failure, as may overcuring of the part. On the other hand, the intrinsic ability of microwave energy to be distributed in a nonuniform fashion may be useful for providing different amounts of heat to different regions of a shoe part. Such a result may permit all regions of a shoe part to be cured to a desired degree, even if the dimensions and geometry of the shoe part differs markedly in different regions. Further, systems and methods in accordance with the present invention permit the joining of different types of materials, in particular EVA materials and rubber materials, with reduced or even no need of an adhesive.

Systems in accordance with the present invention may retain a part or parts to be cured or otherwise processed within a cavity formed in at least a first dielectric material. As explained further herein, multiple types of dielectric materials may be used to alter the distribution of microwave energy and/or the heat generated by the microwave energy interacting with the dielectric itself. The dielectric or dielectrics may be selected so as to be capable of transmitting energy to the shoe part or parts retained within the cavity. The dielectric with a shoe part or parts within the cavity may be placed within a chamber or other container that may receive microwave energy. In one example, one or more ports attached to the walls of the chamber may deliver microwave energy at selected locations within the chamber. In another example in accordance with the present invention, a waveguide may direct microwave energy around at least a portion of the perimeter of the chamber, with slots or other openings providing ports for microwave energy to exit the waveguide and enter into the chamber. In yet a further example in accordance with the present invention, a container having a plurality of openings permeable to microwave energy may be placed within a larger microwave applicator chamber capable of sustaining standing microwaves, such that the plurality of openings selectively admit microwave energy into the contents of the container, thereby achieving a desired distribution of microwave energy across a shoe part or parts to be processed.

Various mechanisms may be used to direct microwave energy within a chamber or container to achieve a desired distribution of energy over a part or parts to be processed. For example, the size and/or position of a given port or slot may be based upon the desired distribution of microwave energy relative to a shoe part contained within a chamber. A further possibility for manipulating the distribution of microwave energy within a chamber or container is the use of deflectors and/or distribution plates. As explained herein, a relatively small chamber, i.e. one that is only a few multiples of a wavelength, may experience an effective 'blow torch' of microwave energy immediately after the microwave energy passes through a port and into a chamber. The primary and secondary lobes of microwave radiation entering a chamber through a port may overcure a part. In a small chamber, a radiation pattern, such as the envelopes of primary and secondary energy lobes, may occupy a substantial portion, such as at least ten percent or more, of the chamber. The primary lobes may form the 'blow torch' and comprise an intense amount of energy. In accordance with the present invention, this intense energy may be deflected and distributed uniformly using a conducting deflector plate oriented between the port or other opening delivering the microwave energy to the chamber and the part or parts to be processed. A distribution plate may similarly comprise a conductive material oriented within a chamber or container to distribute microwave energy along and/or within the chamber. Generally speaking, a deflector may be thought of as a conducting material oriented between a port, opening, or other microwave energy application point and the part or parts to be processed, while a distribution plate may be thought of as a conductive material oriented away from the path between a port, opening, or other microwave energy source and the part or parts to be processed. Yet further elements that may be useful in directing energy in a desired distribution over a shoe part or parts are described herein, such as conducting rods that may be paired with slots, ports, or other openings, arrangements of slots or other openings to selectively permit the entrance of standing microwaves and the like.

Microwave energy applied to one or more items using systems and/or methods in accordance with the present invention may be used to perform a variety of functions. For example, EVA material may be melted, foamed, and/or bonded in accordance with the present invention.

Further, examples of systems in accordance with the present invention may provide or permit the application of pressure to a part or parts to be processed. Such pressure may come from a conventional press that may exert pressure on opposing sides of a chamber, the construction of the chamber itself, or any other source.

Some examples of the present invention described herein generally relate to systems and methods for customizing a distribution of microwave energy within a chamber of a compact microwave press (CMP) to uniformly process a non-uniform workload. The nonuniform workload may comprise one or more materials. Aspects of the present invention configure ports, deflectors, distribution plates, waveguides, and conducting rods to tune microwave energy based on characteristics of the non-uniform workload, such as components of a shoe.

Aspects of the present invention may be particularly useful in curing a shoe sole. As described in the present invention, a CMP may be used to cure a shoe sole material. Shoe sole material may comprise midsole material and/or outsole material. Midsole material may comprise any type of cushioning and/or ornamental material for a shoe midsole. EVA foam may be referenced in examples herein as a midsole material, but other materials may be cured or otherwise processed in accordance with the present invention. Outsole material may comprise any material that contacts the floor, ground, or other surface when a shoe is worn. Rubber is referenced in examples herein as an outsole material, but other materials may be cured or otherwise processed in accordance with the present invention. FIG. 1A shows system 100 that may be utilized with aspects of the present invention in curing a shoe sole material. FIG. 1A shows a microwave filled chamber 110, a workload 111, a thermal heating component 112, a pressure application component 113, a microwave generator 114, a primary transmission line component 115, a secondary transmission line component 116, a tertiary transmission line component 117, and a computing device 118. Aspects of the present invention may utilize any combination of the components of system 100, additional components, and/or fewer components. The microwave chamber 110 may be filled with dielectric containing workload 111 within a cavity formed in the dielectric. Dielectric may comprise multiple physical portions of material that may be opened or separated to permit the insertion of a workload into the cavity. The microwave chamber 110 is connected to the microwave generator 114 by the primary transmission line component 115, secondary transmission line component 116, and tertiary transmission line component 117. The microwave generator 114 may optionally be coupled to the computing device 118. The computing device 118 may be coupled to the thermal component 112 and/or pressure application component 113. Computing device 118 may adjust the application of microwave energy from microwave generator 114 and/or the amount of pressure applied by pressure application component 113 based upon parameters such as the time elapsed within a curing cycle and/or the temperature measured by a thermal component 112.

The energy inside of the chamber 110 is coupled from the microwave generator 114 through the transmission line components. The selection, configuration, and/or arrangement of transmission line components enable tuning of the microwave energy delivered and enable a high degree of customization of energy distribution within the chamber 110. The primary transmission line components 115 connect the generator and the chamber. The secondary transmission line components 116 are used at an interface between the primary transmission line 115 and the chamber 110. The tertiary transmission line components 117 are used inside the chamber 110 to modulate the energy around the workload. The tertiary transmission line components 117 may be used to focus or to defocus energy into the workload or a portion of the workload. Primary transmission line component 115 may comprise a waveguide (in the present example) or the open space of an applicator chamber (described in subsequent examples), or any other mechanism that delivers microwave energy to a chamber such as chamber 110 in the present example. Secondary transmission line component 116 may comprise an entry point for microwave energy to enter the chamber. Secondary transmission line component 116 may comprise a port connected to a waveguide (as in the present example), a slot or other structure joining a chamber to a waveguide (as described in examples below), openings in the chamber that permit the entry of microwave energy from the ambient space around the chamber (as also described in examples below), or any other structure that permits microwave energy to enter the chamber 110. Tertiary transmission line component 117 may comprise any additional component that alters the distribution of microwave energy within the chamber 110. Tertiary transmission line components 117 may comprise conducting deflector plates, conducting distribution plates, conducting rods, and the like, some examples of which are described further below. Further, the type and/or configuration of dielectric material may vary within the chamber 110, further altering the distribution of microwave energy within the chamber 110. A system in accordance with the present invention may omit tertiary transmission line components 117 if primary 115 and secondary 116 transmission line components achieve a desired distribution of microwave energy within a chamber 110.

Figure 1B:
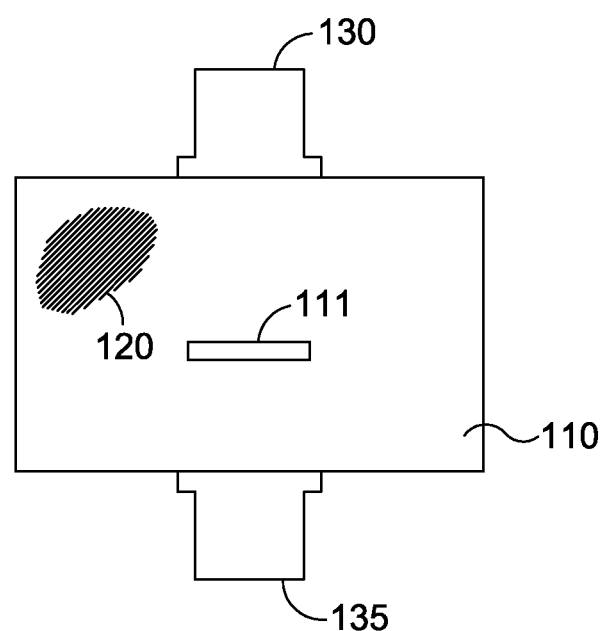
FIG. 1B is an exemplary microwave system used in various aspects of the present invention.
Figure 1C:
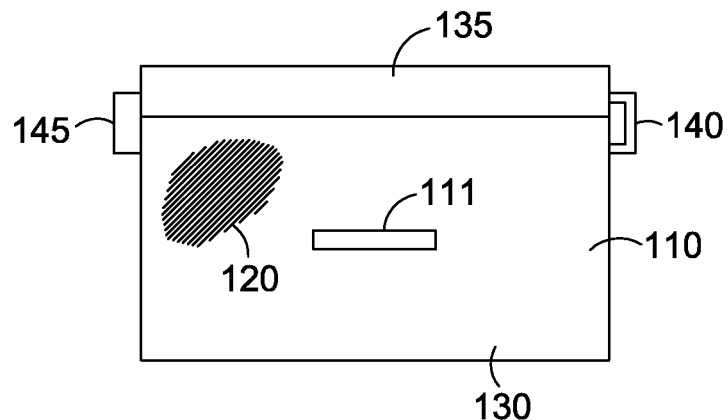
FIG. 1C is an exemplary microwave system used in various aspects of the present invention.
Figure 1D:
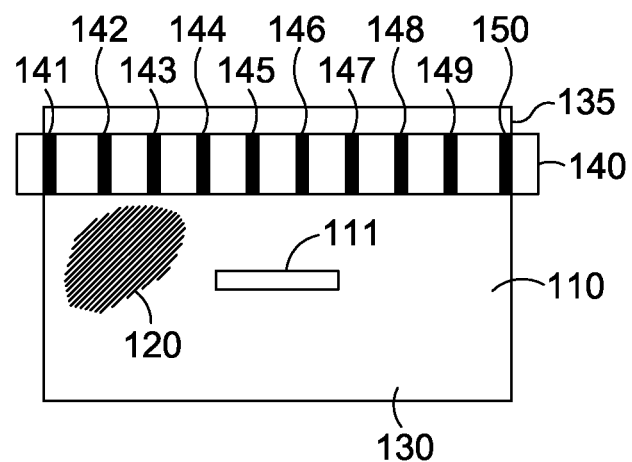
FIG. 1D is an exemplary microwave system used in various aspects of the present invention.

FIGS. 1B, 1C, and 1D show variations of a chamber 110 assembly that may be used in aspects of the present invention. FIG. 1B shows an exemplary chamber 110 housing a load 111 and a dielectric 120, where the chamber 110 is in between a first press component 130 and a second press component 135. FIG. 1C shows an exemplary chamber 110 housing a load 111 and a dielectric 120. The exemplary chamber 110 comprises a top portion 135 and a bottom portion 130. The load 111 is located in the bottom portion 130 in this example. Connecting the top portion 135 to the bottom portion 130 in this example is a hinge 140. Hinge 140 is attached to the top portion 135 and the bottom portion 130 and comprises joints that may facilitate the chamber 110 in moving between an open position, with the top portion 135 raised and a closed position, with the top portion 135 lowered onto the bottom portion 130. A latch 145 may be attached to the top portion 135 and bottom portion 130 to allow the top portion 135 to remain lowered and connected to the bottom portion 130. FIG. 1D shows an exemplary chamber 110 housing a dielectric 120 and comprising a top portion 135 and a bottom portion 130, where the bottom portion houses a load 111. Connecting the top portion 135 to the bottom portion 130 in this example is a retainer 140. The retainer 140 comprises latching components 141, 142, 143, 144, 145, 146, 147, 148, 149, and 150 that facilitate a connection between the top portion 135 and the lower portion 130. Latching components 141-150 may comprise screws, clamps or any other items that facilitate a connection between two components.

Generally, curing of an EVA or similar material comprises a cross-linking of a polymer chain with another polymer chain and occurs when an EVA material is heated. A typical shoe sole is shaped in a non-uniform manner as the heel portion of the shoe sole may have a shorter width and taller height than the ball portion of the shoe sole. Curing a shoe sole may involve placing an EVA material inside a shoe mold where the original size of the EVA material is substantially less than the size of the shoe mold. During the curing process the size of the EVA material may expand to become a size similar to that of the shoe mold. Additionally, the volume and mass of the EVA material may change throughout the curing process. Curing a shoe sole may also involve placing an EVA material inside a shoe mold where the original size of the EVA material is similar to the size of the shoe mold. During the curing process, the volume, mass, and size of the EVA material inside the shoe mold may change. Because the volume, mass, and size of EVA material within a shoe mold may change throughout the curing process, various portions of the EVA material may require differing amounts of energy. For instance, EVA material associated with the heel portion of a shoe sole may require less energy than EVA material associated with the ball portion of a shoe sole.

Explained further, an EVA material that is to be cured may have cross-linking agents and blowing agents. If the EVA material undergoes poor curing prior to the activation of the blowing agent, then the innate strength of the under-cured (low cross-link density) portions of the EVA material will not adequately counteract the expansion caused by the blowing agent. The under-cured areas will expand more than the cured areas (high cross-link density). The catalyst and the blowing agents have thermal windows of activation that are sequential to one another. Any thermal non-uniformity established in the cross-linking in manifested as exaggerated bloating caused post-activation of the blowing agent. If the EVA material undergoes poor curing with low cross-linking density prior to the activation of the blowing agent, then the innate strength of the EVA material in the under-cured portions will not adequately counteract the expansion caused by the blowing agent causing the under-cured areas to expand more than the cured areas of high cross-linking density.

Figure 2:
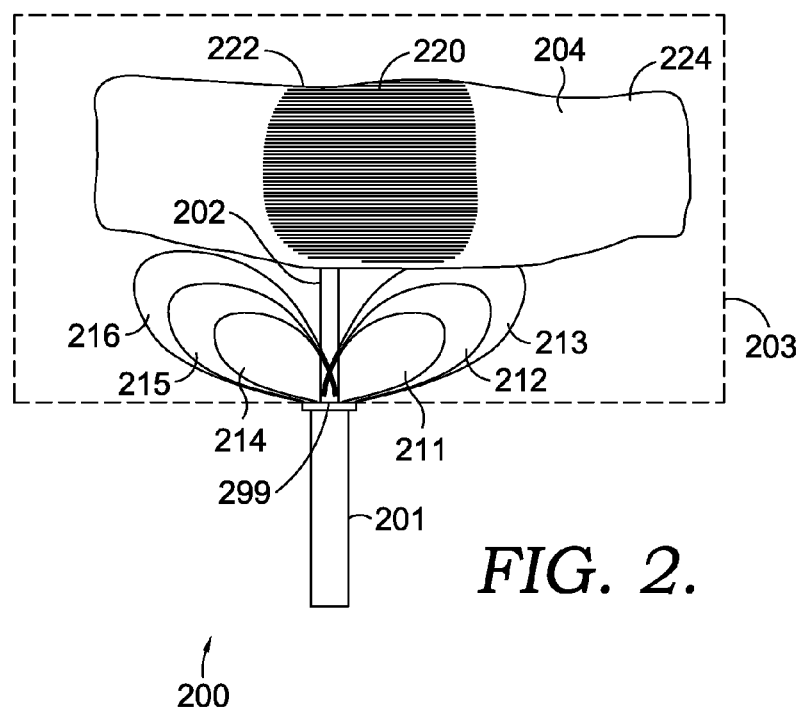
FIG. 2 is a schematic diagram energy distribution as described in relation to various aspects of the present invention.
Figure 3:
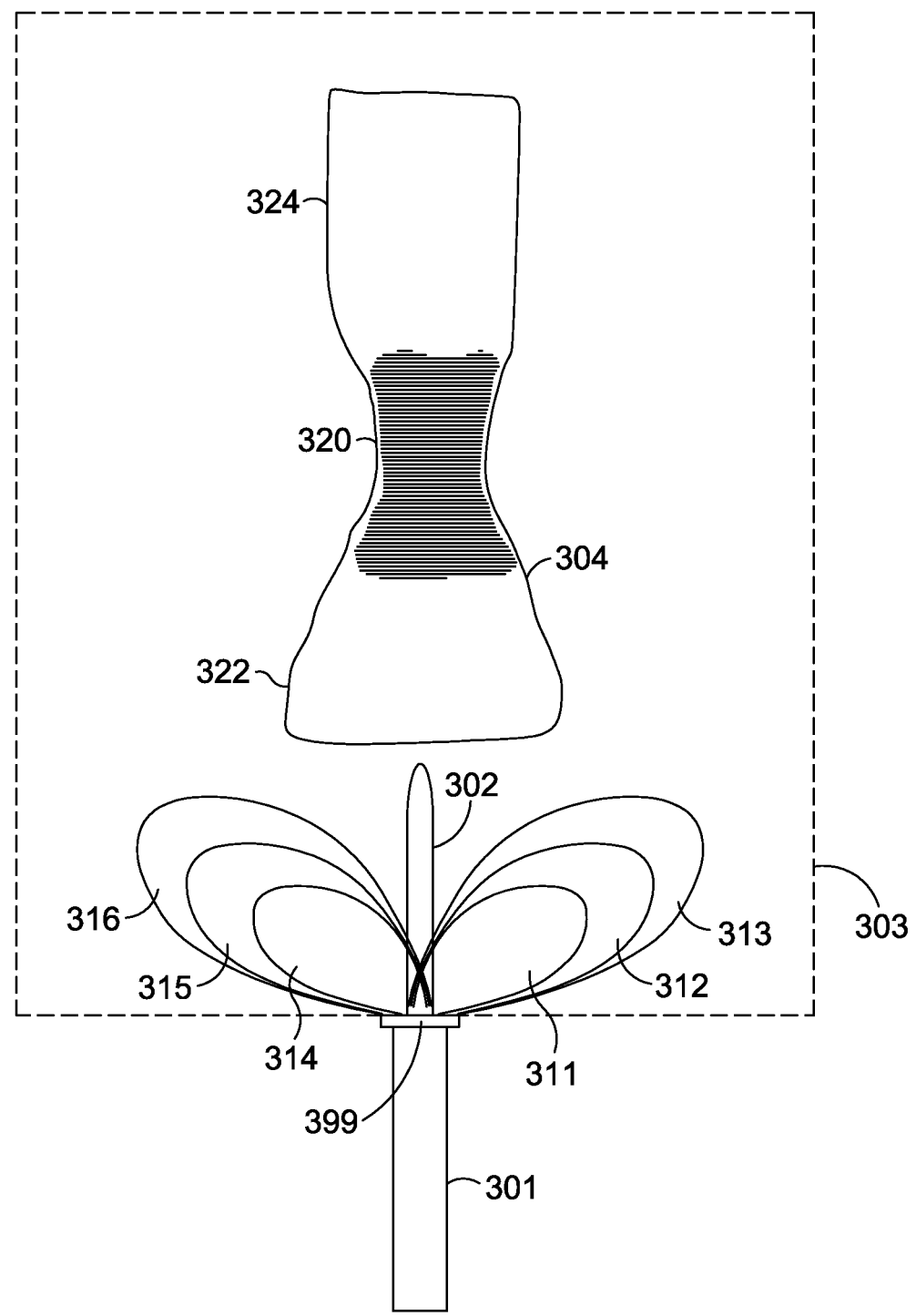
FIG. 3 is a schematic diagram energy distribution as described in relation to various aspects of the present invention.

FIG. 2 shows an example of a material 204 that is non-uniformly cured. In the example of FIG. 2, material 204 comprises a rectangular preformed EVA material, rather than an even more challenging shape. FIG. 2 shows a waveguide 201 with a port 209 providing energy, shown as a primary energy lobe 202 and secondary energy lobes 211, 212, 213, 214, 215, and 216, into a chamber 203 that houses a material 204. A shaded area 220 of material 204 has a wider width than the surrounding areas 222 and 224 of material 204. The variation of widths in material 204 is due to non-uniform curing. FIG. 3 also provides of an example of material that is non-uniformly cured. FIG. 3 shows a waveguide 301 with a port 399 providing energy, shown as a primary energy lobe 302 and secondary energy lobes 311, 312, 313, 314, 315, and 316, into chamber 303 that houses material 304. A shaded area 320 of material 304 has a narrower width than the surrounding areas 322 and 324. The variation of widths in material 304 is due to non-uniform curing.

Characteristics of a load may affect the uniformity of a load during a curing process. Characteristics of a load may be a silhouette, a volume, a mass, a length, width, a height, a type of material, a location of the load in relation to a port, a location of the load in relation to a deflector, a location of the load in relation to distribution plate, a location of the load in relation to a portion of a chamber, a location of the load in relation to an conducting rod, and a location of the load in relation to a waveguide. One portion of a load may require an amount of energy different from another portion due to the characteristics of a load being non-uniform. For instance, a heel portion of a shoe sole may have a larger mass than a ball portion of a shoe sole.

Aspects of the present invention may comprise processing a load comprised or rubber and/or compositions of ethylene vinyl acetate, such as EVA. As will be described further below, a load may be placed within a cavity formed in at least a first dielectric material within a chamber. The chamber may be comprised of materials that allow microwave energy to effectively heat EVA and rubber. The chamber may be constructed of materials that may not completely absorb or completely reflect microwave energy. Further, the chamber may be constructed of dielectric materials that are optimized for thermal conductivity to enable uniform and rapid temperature equilibration when heated to prepare for a curing process. The dielectric materials may also be optimized for thermal conductivity to enable uniform and rapid temperature equilibration when cooled to enable demolding of a part with minimal distortion and during a process of curing. The materials of the chamber may structurally withstand temperatures and pressures up to 300 degrees Celsius and 2000 psi internal pressure. In certain aspects of the present invention, the materials may need to withstand only 150 degree Celsius temperature and less than 500 psi internal pressure.

Examples of dielectric materials that may fill a chamber and provide a cavity to retain a load are Liquid Silicone Rubber (LSR), neat Teflon, glass-filled Teflon, (neat Teflon and glass-filled Teflon may be referred to herein as 'PTFE'), and epoxy, but any type of dielectric material may be used in accordance with the present invention. In LSR the relative permittivity (relative to vacuum) approaches that of EVA and the dielectric loss factor with respect to temperature is much lower than EVA as it approaches a process temperature. This allows energy to propagate uniformly through the combination of mold and/or part materials and preferably heat the EVA as it may have a higher loss factor. In aspects of the present invention, to transfer heat in an efficient manner the LSR or other dielectric may be pre-heated before the process of curing in order to conduct heat to an EVA item, which may allow the EVA item to result in a surface volume that is similar to the internal volume.

The relative permittivity PTFE is lower than the relative permittivity of EVA in the process temperature. PTFE has a very low dielectric loss factor with respect to temperature and will only heat up slightly in a microwave energy field.

These properties allow uniform microwave energy propagation. In aspects of the present invention, PTFE is heated up to a process temperature to provide enough heat at the surface to obtain uniform reactivity at the surface and within the volume of the EVA. The thermal conductivity of PTFE is also low, so heat does not transfer very effectively. To be effective as part of the overall molding process, PTFE may have a higher thermal conductivity than the load (via compounding) and be as thin as possible to minimize mass and distance for heat to travel.

Epoxy heats up more quickly in response to microwave energy than EVA. Aspects of the present invention balance the heat generated in EVA and the cavity comprising epoxy in order to balance out interfacial heating with center part heating. This is accomplished by changing the thickness of the epoxy material comprising the cavity at a loss factor close to that of EVA. The dielectric constant of the epoxy should be as close to the dielectric constant of EVA as possible to allow uniform propagation of microwaves through both materials.

For at least these reasons, it is highly desirable to have customizable energy distribution inside a chamber as the curing of material is related to the energy distribution. Aspects of the present invention allow for energy distributions within a chamber to be customized in order to facilitate uniform curing a non-uniform load based on various characteristics of the material.

In order to provide an easy to understand description of the aspects of the present invention, this description is divided into a discussion of three key systems, those systems are: (1) multiport launch, (2) modified slotted waveguide, and (3) a cage. Although the three key systems may be discussed individually, characteristics, components and features of each system may be interchangeably used and/or combined with one another.

Multiport Launch

One example of a system in accordance with the present invention may be referred to as a multiport launch system. A multiport launch system facilitates a shaping of energy distribution within a chamber utilizing a combination and customized configuration of launch ports and deflectors. The combination and customization of launch ports and deflectors are based on characteristics of the load, such as length, width, and density. Further, aspects of the multiport launch system comprise a use of conducting rods, waveguides, and distribution plates, which may also be configured and customized based on characteristics of the load. Aspects of the present invention may be particularly applicable when an antenna irradiation pattern occupies a substantial portion of a chamber and when at least a portion of a load intersects the irradiation pattern.

Figure 4:
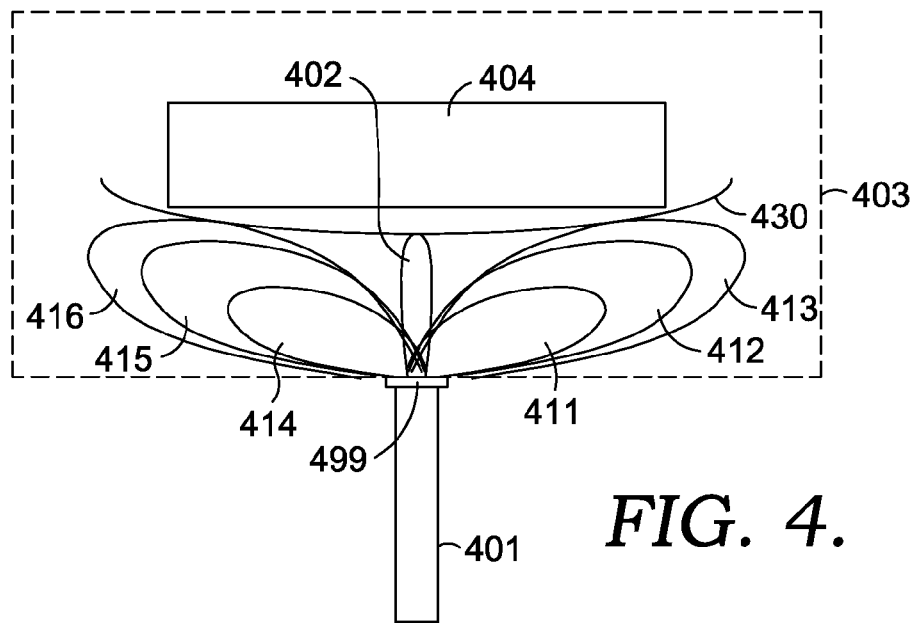
FIG. 4 is a schematic diagram energy distribution as described in relation to various aspects of the present invention.

An example of a launch port and deflector being configured to customize and shape energy distribution is shown in FIG. 4. FIG. 4 shows a waveguide 401 with a port 499, providing energy in the form of a primary energy lobe 402 and secondary energy lobes 411, 412, 413, 414, 415, and 416, into chamber 403 housing a load 404 and deflector 430. Instead of the energy lobes 402 and 411-416 meeting the load 404 directly, the energy lobes first meet the deflector 430 as the deflector is positioned between the waveguide 401 and the load 404. The deflector 430 may cause the energy lobes 402 and 411-416 to travel around the deflector 430, thus customizing the energy distribution within the chamber.

As indicated above, a multiport launch system utilizes combinations and configurations of launch ports, deflectors, distribution plates, conducting rods, and waveguides to customize energy distribution based on characteristics of a load. Each of the launch ports, deflectors, distribution plates, conducting rods, and waveguides will be described individually and in combination with one another below. However, the combinations and features of launch ports, deflectors, distribution plates, conducting rods, and waveguides are not limited to these examples.

Figure 5A:
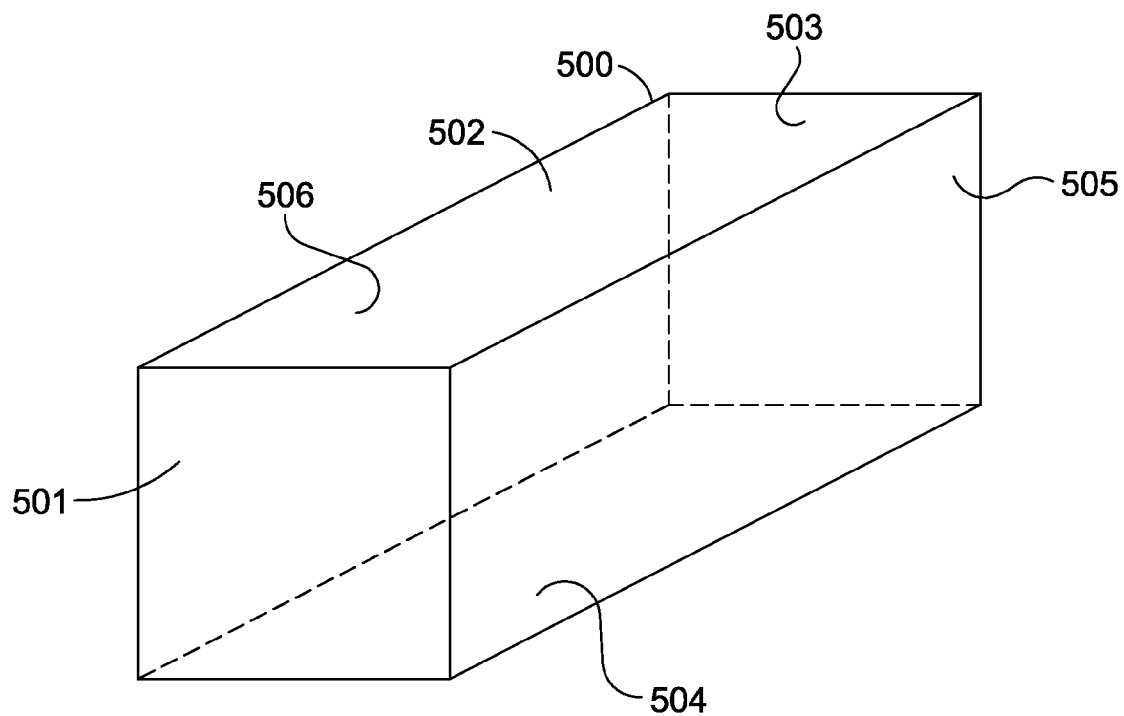
FIG. 5A is a schematic diagram of a chamber as used in various aspects of the present invention.

A chamber associated with the multiport launch may be small relative to the wavelengths of microwave energy applied. In certain aspects, a chamber may comprise a length of 10 inches, a width of 4 to 6 inches, and a height of 2 inches. However, the measurements of a chamber may vary based on a size of a shoe sole construction. In some aspects, a chamber may be configured to allow up to 2 to 3 wavelengths in distance between a load and a surface of the chamber, but the load may be positioned only a small fraction of a wavelength from the surface of the chamber as well. The chamber may be of various shapes, including rectangular or square. A workload associated with the multiport launch remains stationary inside the chamber, but also may be formed from one or more curved surfaces. In some aspects, the load may reside within a distance within 1 to 3 wavelengths from a launch port. A chamber may have a top portion, bottom portion and one or several side portions. To more easily describe aspects of the present invention, an exemplary chamber 500 is provided in FIG. 5A that has a top portion 502, bottom portion 504, and four side portions 501, 503, 504, and 506, where each of side portion 505 and 506 have a length longer than that of side portions 501 and 505.

A chamber associated with aspects of the present invention may be constructed of a conducting material, such as steel, copper, aluminum and/or titanium. One or more dielectric materials may be contained within a chamber. The one or more dielectric materials in a chamber may have a cavity configured to retain a load, such as a molded part, or other materials associated with a shoe sole construction. In some aspects, for instance aspects concerning a load comprising EVA in a foam form, the dielectric constant of the dielectric materials within the chamber may be greater than or equal to the dielectric constant of the load. In other aspects, the dielectric constant of the dielectric materials within the chamber and may be less than or equal to the dielectric constant of the load contained within the cavity in order to effectively transfer heat to the load.

Figure 5B:
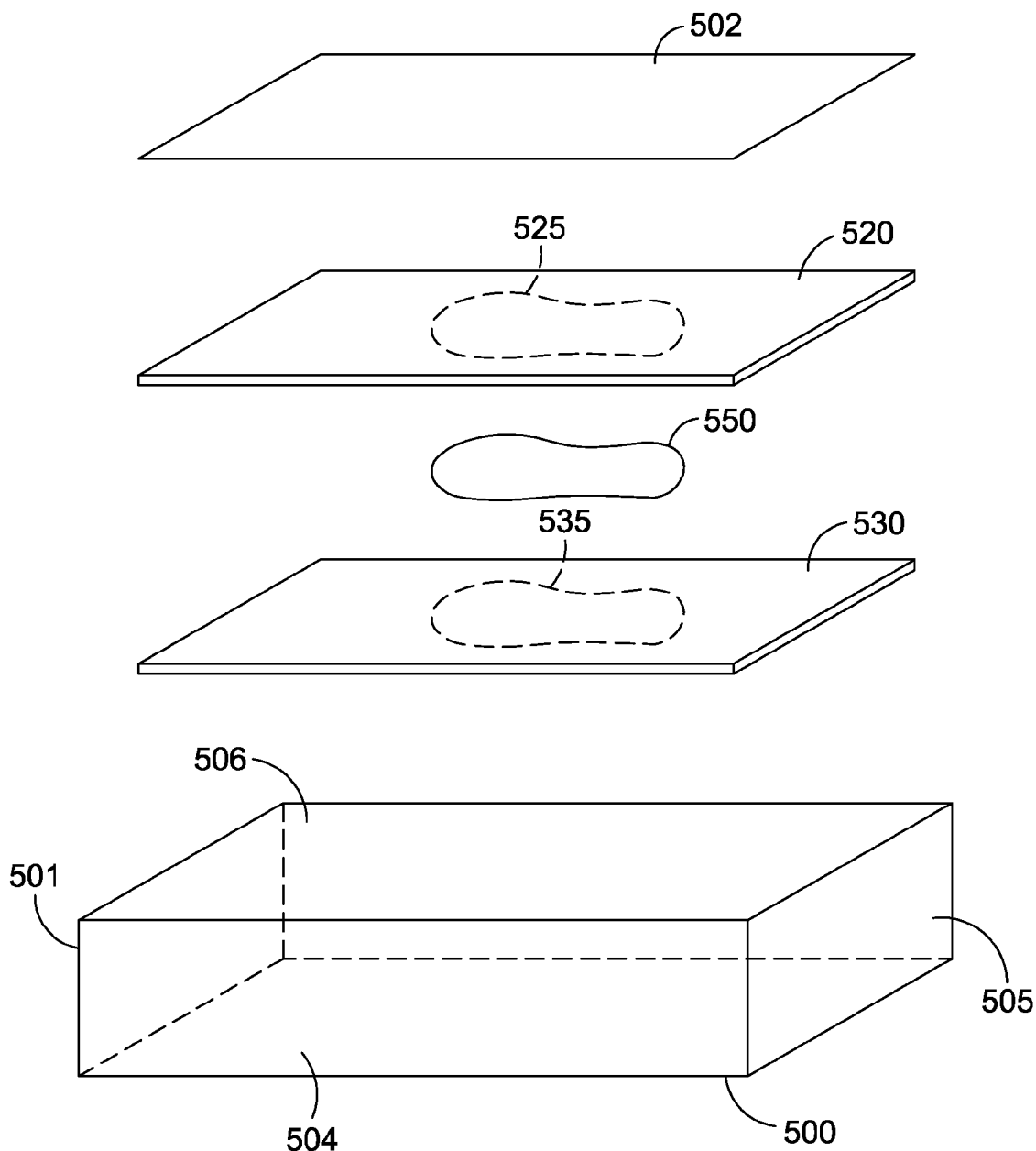
FIG. 5B is a schematic diagram of a chamber comprising a load as used in various aspects of the present invention.

FIG. 5B provides a layered illustration of chamber 500 with a top portion 502, a bottom portion 504, and side portions 501, 503, 504, and 506. FIG. 5B also shows a load 550 which may be placed within a cavity between a top portion of a dielectric material 520 and a bottom portion of a dielectric material 530. A top portion 525 of the cavity may extend into the top portion of the dielectric material 520, and a bottom portion 535 of the cavity may extend into the bottom portion of the dielectric material 530.

Aspects of the present invention comprise a variety of numbers, placements, and configurations of launch ports to customize energy distribution. In some aspects, a multiport launch system may have only one launch port. In other aspects, a multiport launch system may have two, three, four, or more launch ports. Launch ports may be placed on a top portion, bottom portion, or any side portions of a chamber. For instance, a launch port may be placed at top portion 502 of chamber 500.

Figure 6A:
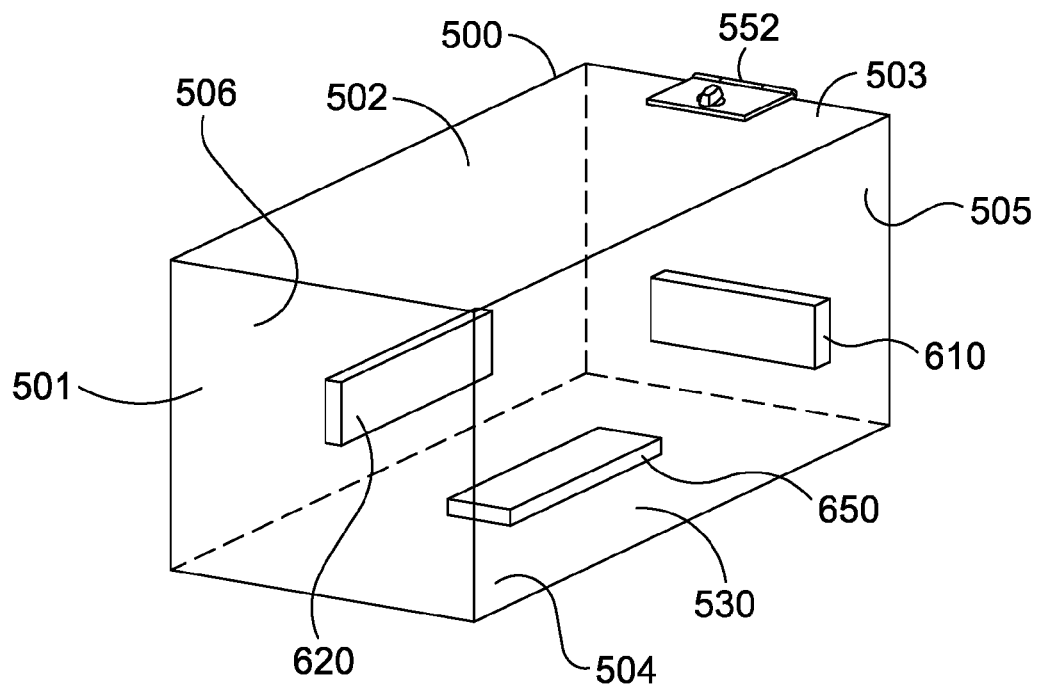
FIG. 6A is a schematic diagram of a chamber including ports as used in various aspects of the present invention.

In aspects that have more than one launch port, the launch ports may be placed in specific configurations in relation to one another in order to customize energy distribution. In one aspect, as shown in FIG. 6A, chamber 500 has a load 530 with port 610 located at side portion 505 and port 620 located at side portion 501. Also depicted in FIGS. 6A and 6B is a retention mechanism 552.

Figure 6B:
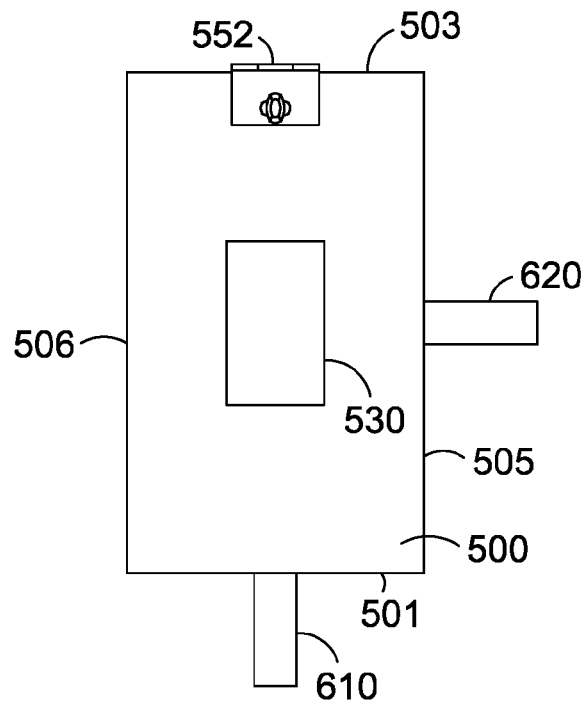
FIG. 6B is a schematic diagram of a chamber including ports as used in various aspects of the present invention.
Figure 7A:
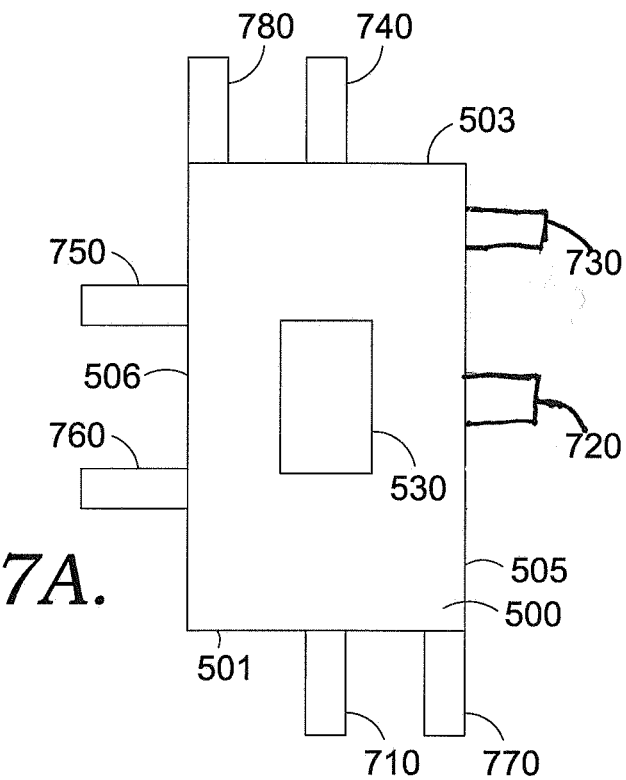
FIG. 7A is a schematic diagram of a chamber including ports as used in various aspects of the present invention.

FIGS. 6B and 7A-7E provide schematic illustrations of chamber configures with various numbers of ports. FIG. 6B shows a schematic illustration of a chamber 500 housing a load 530 with port 610 located at side portion 501 and port 620 located at side portion 505. In another aspect, as shown in FIG. 7A, chamber 500 has a load 530 with ports 720 and 730 located at side 505, ports 750 and 760 located at side 50, ports 710 and 770 at side 501, and ports 740 and 780 at side 503. Additionally, port 770 is located at a corner of side portion 501 and 505 and port 780 is located at a corner of side portion 503 and 506.

Figure 7B:
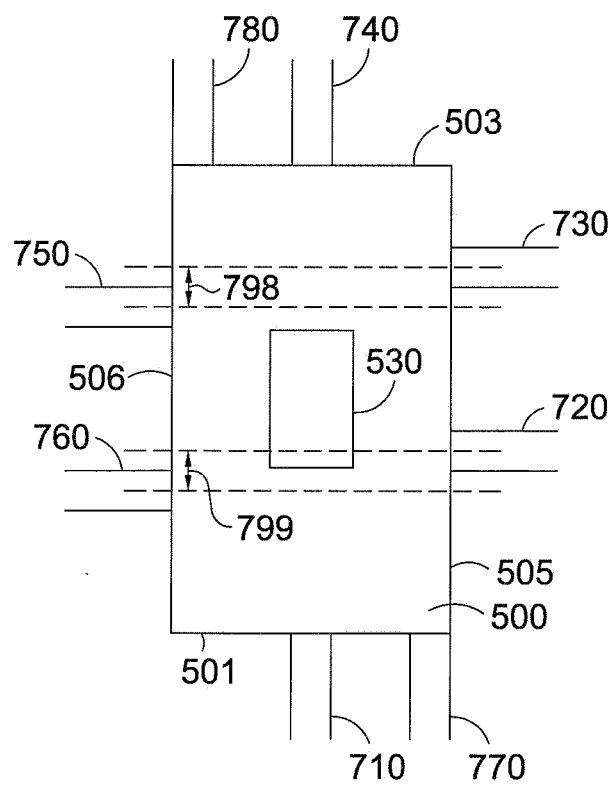
FIG. 7B is a schematic diagram of a chamber including ports as used in various aspects of the present invention.
Figure 24:
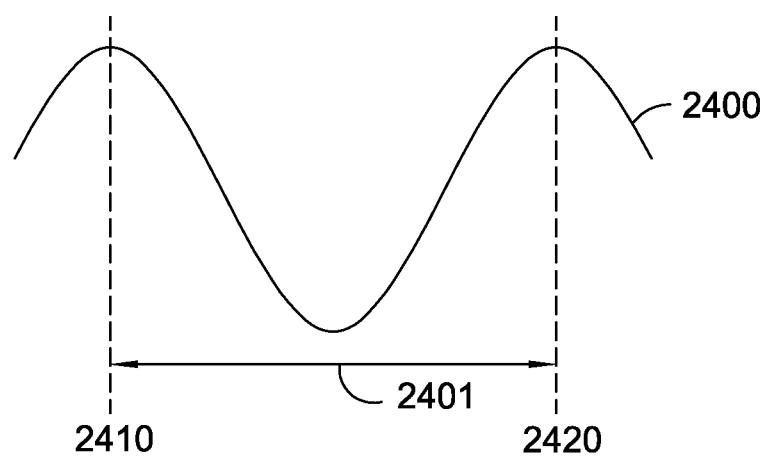
FIG. 24 is a schematic diagram of wavelength in relation to aspects of the present invention.

FIG. 7B shows a chamber 500 has a load 530 with ports 720 and 730 located at side portion 505, ports 750 and 760 located at side portion 506, ports 710 and 770 located at side portion 501, and ports 740 and 780 located at side portion 503. As shown in FIG. 7B, port 720 may be staggered a length of 799 from port 760, and port 730 may be staggered a length of 798 from port 750. Lengths 798 and 799 may be measured from a center of ports 720, 730, 750 and 760. Lengths 798 and 799 may vary between ¼ to ½ wavelength. Lengths 798 and 199 may be large enough to prevent plumes of microwave radiation from opposing sides to overlap. By staggering ports between ¼ and ½ wavelength, a complimentary radiation pattern, standing waves may be established within the chamber providing uniform energy distribution. For clarity purposes, a microwave 2400 is illustrated in FIG. 24. Microwave 2400 may have a wavelength between points 2401 between lines 2410 and 2420. Further, an effective staggering of ports may be obtained by switching ports between an open position and a closed position such that ports may not have to physically be staggered in order to obtain the effect of a complimentary radiation pattern. For instance, for a first port and a second port located across from one another, the first port may be closed while the second port may be open. In this instance, multiples of the first and second port configuration may be provided within a chamber to establish a standing wave pattern. Ports may be associated with switches or a computing system in order to switch a port from a closed position or an open position. Additionally, metallic tape may be used to close a port.

Figure 7C:
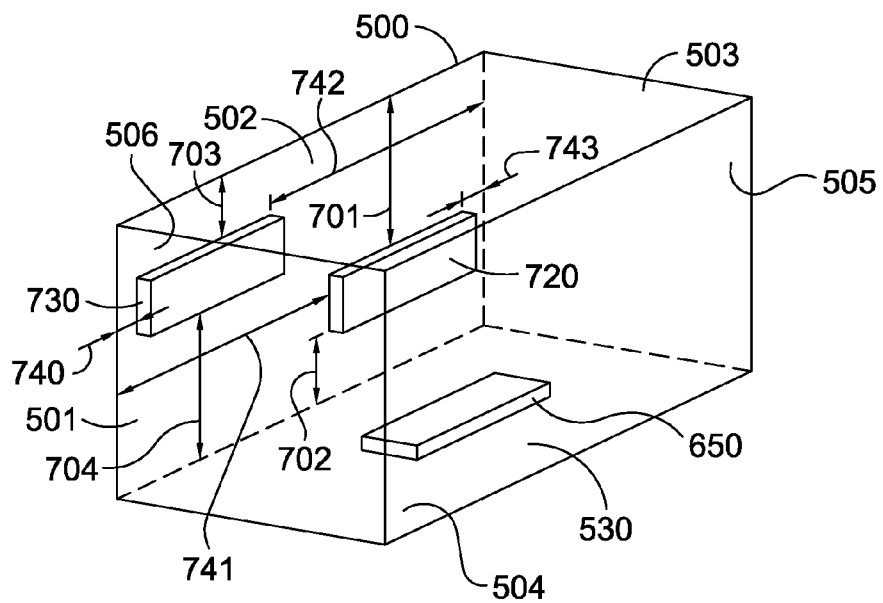
FIG. 7C is a schematic diagram of a chamber including ports as used in various aspects of the present invention.

FIG. 7C illustrates a chamber 500 comprising ports a varying heights and locations on side portions 506 and 505. Port 730 may be located at a distance 704 from the bottom portion 504, a distance 703 from top portion 502, a distance 740 from side portion 501 and a distance 742 from side portion 505. Port 720 may be located at a distance 702 from the bottom portion 504, a distance 701 from top portion 502, a distance 741 from side portion 501 and a distance 743 from side portion 505. Generally, ports may be located at any height and/or location within a chamber.

Figure 7D:
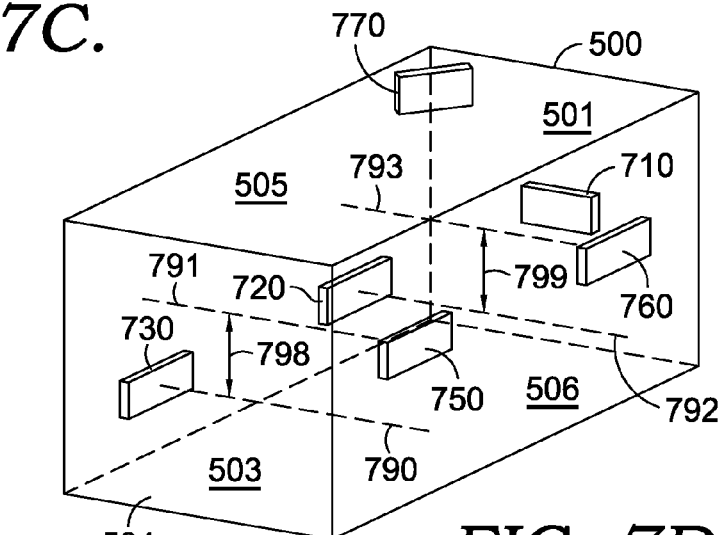
FIG. 7D is a schematic diagram of a chamber including ports as used in various aspects of the present invention.

FIG. 7D illustrates a chamber 500 comprising staggered ports and a port located in a corner. Port 730 may be staggered a distance of 798 from port 750. The distance 798 being between lines 790 and 791 where lines 790 and 791 are illustrative of a center of port 730 and port 750, respectively. Port 720 may be staggered a distance of 799 from port 760. The distance 799 being between lines 792 and 793 where lines 792 and 793 are illustrative of a center of port 720 and 760 respectively. Distances 798 and 799 may be varied between ¼ to ½ wavelength. As described above, by staggering ports between ¼ and ½ wavelength, a complimentary radiation pattern, standing waves may be established within the chamber providing uniform energy distribution.

Additionally, ports may be located in any corner of a chamber. Port 770 of FIG. 7D is shown as being located in a corner, the corner comprising intersecting planes of side portion 501 and side portion 505. In some aspects, a first port may be located in a corner comprising intersecting planes of side portions 501 and 506 near top portion 502 while a second port may be located in a corner comprising intersecting places of side portion 505 and 503 near the bottom portion 504 and/or near the top portion 502.

Figure 7E:
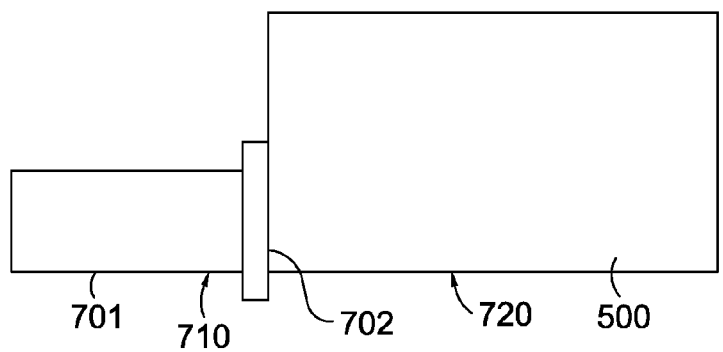
FIG. 7E is a schematic diagram of a chamber including ports as used in various aspects of the present invention.

In some aspects, a plane of an internal wall of a waveguide may be matched to a plane of a chamber allowing the chamber to seemingly seamlessly extend from the waveguide as shown in FIG. 7E. FIG. 7E shows a waveguide 701, a port 702 and a chamber 500. A plane of an internal wall of waveguide 701, illustrated at 710 is matched to the plane 720 of chamber 500 minimizing a mismatch between a waveguide and a chamber.

Figure 8:
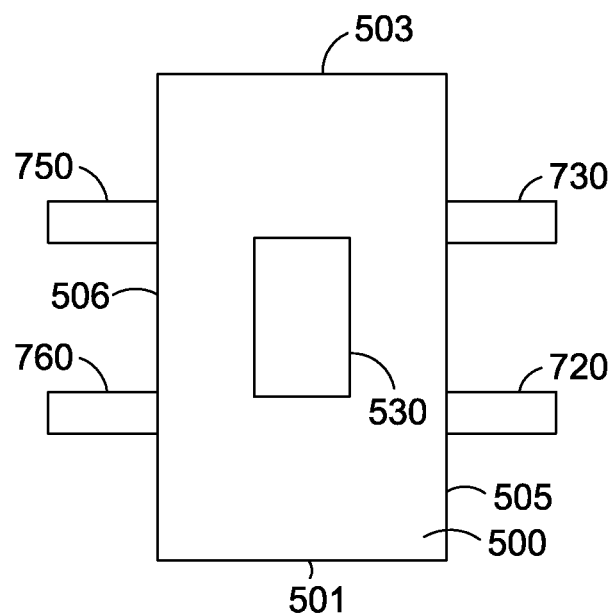
FIG. 8 is a schematic diagram of a chamber including ports as used in various aspects of the present invention.

With continued reference to FIG. 8 for exemplary purposes, various ports may provide varying amounts of power or energy per unit of time from different ports. For instance, port 720 may provide a different amount of energy than port 730. Additionally, port 720 may provide energy for a different amount of time than port 760. In some aspects, port 720 may provide a higher amount of energy for a shorter amount of time than port 760. In other aspects, port 720 may provide a higher amount of energy for a longer amount of time than port 760. In some aspects, a computer system, such as computer system 118 of FIG. 1A, may be configured to control and program an amount of energy provided at each port.

Figure 9:
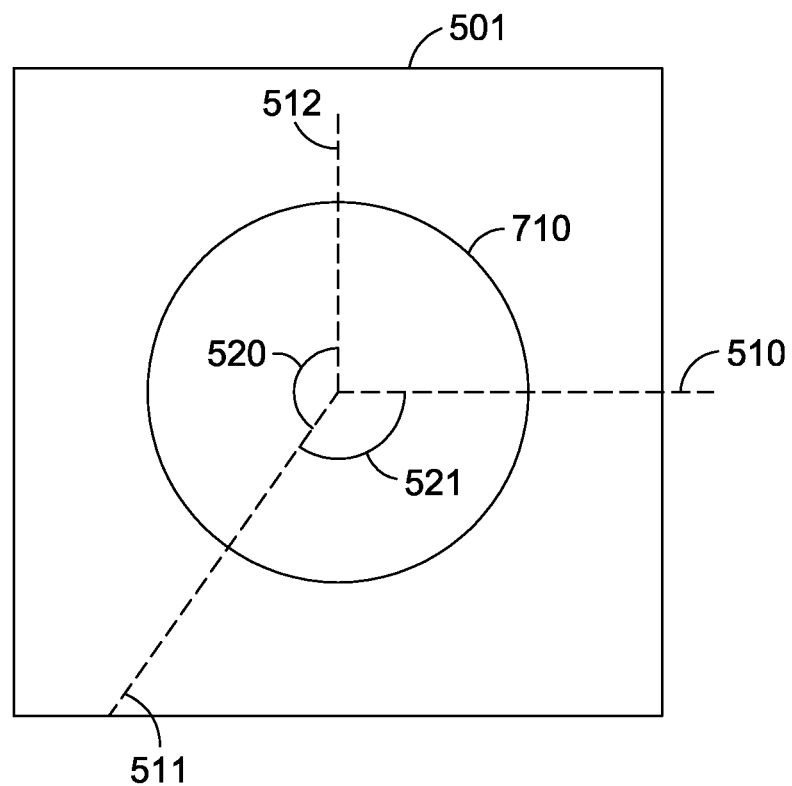
FIG. 9 is a schematic diagram of a port orientation as used in various aspects of the present invention.

A port may be configured at a specific entrance angle and at a specific orientation angle. Referring to FIG. 9, side portion 501 is shown with port 710. In order to provide a description of various entrance angles and orientation angles, an x-axis 510, y-axis 511, and z-axis 512 with angles 520 and 521 in relation to port 720. Entrance angle 520 may vary from 30 degrees and 120 degrees. Orientation angle may vary from 30 degrees to 120 degrees. The orientation and entrance angle may change a direction of energy lobes entering a chamber, allowing for energy distribution.

Figure 10A:
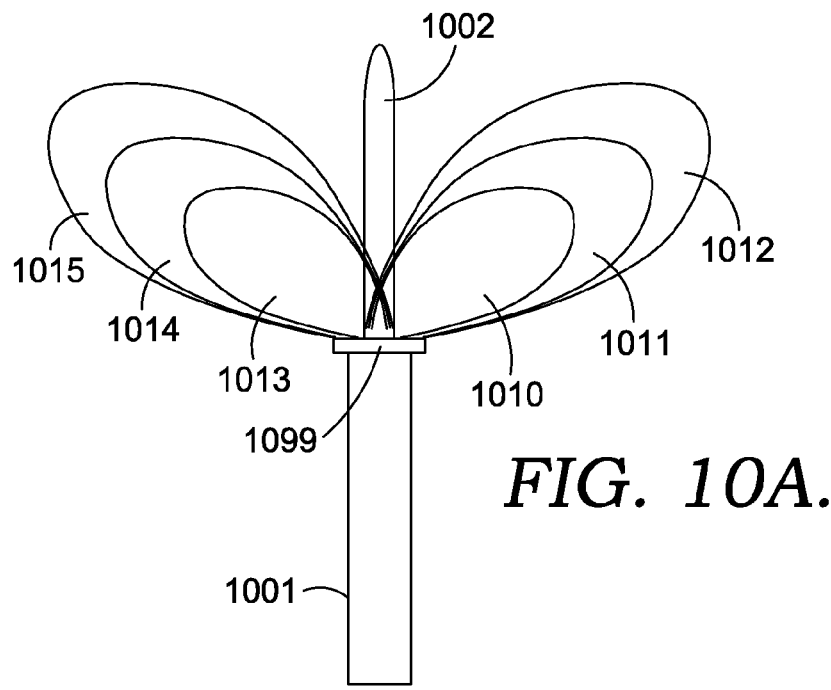
FIG. 10A is a schematic diagram of energy distribution of port as described in relation to various aspects of the present invention.
Figure 10B:
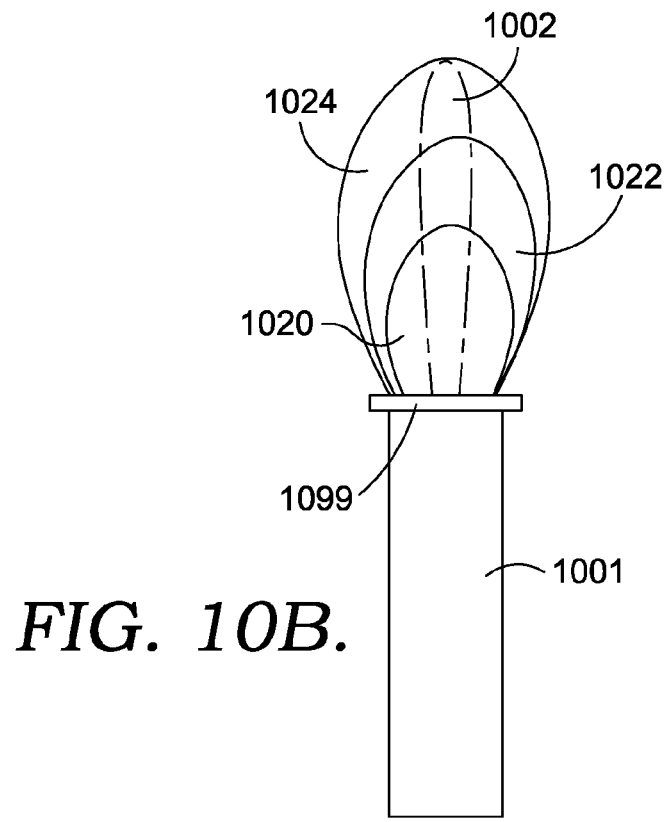
FIG. 10B is a schematic diagram of energy distribution of port as described in relation to various aspects of the present invention.

FIG. 10A shows a waveguide 1001 with a port 1099 and energy lobes comprising a primary energy lobe 1002 and secondary energy lobes 1010, 1011, 1012, 1013, 1014, and 1015. The orientation of the waveguide that couples microwave energy into the chamber influences both the direct irradiation heating as well as the modal pattern heating. As shown in comparison of FIG. 10A to 10B, the energy lobes 1010 to 1015 are turned 90 degrees when waveguide 1001 is twisted by 90 degrees to provide energy lobes 1020, 1022, and 1024. Given an energy lobe pattern, which depends on the waveguide geometry and the operating frequency, energy lobes may intersect a load in specific positions and drive the heating preferentially in those positions.

Figure 11A:
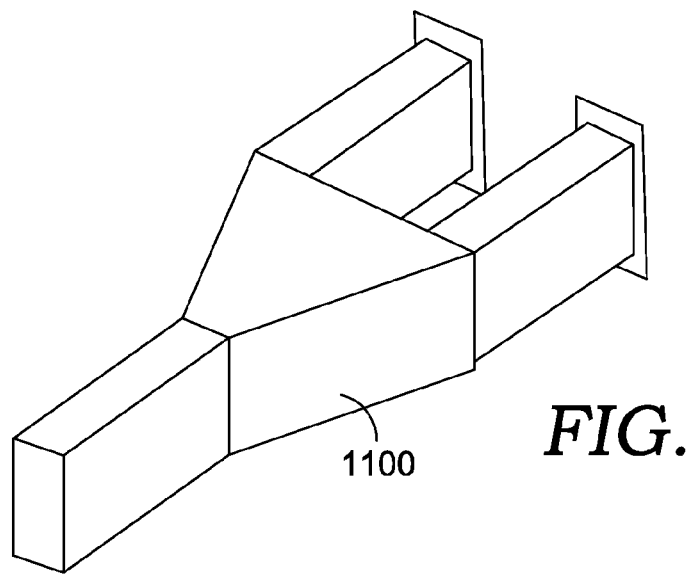
FIG. 11A is a schematic diagram of a splitter as used in various aspects of the present invention.
Figure 11B:
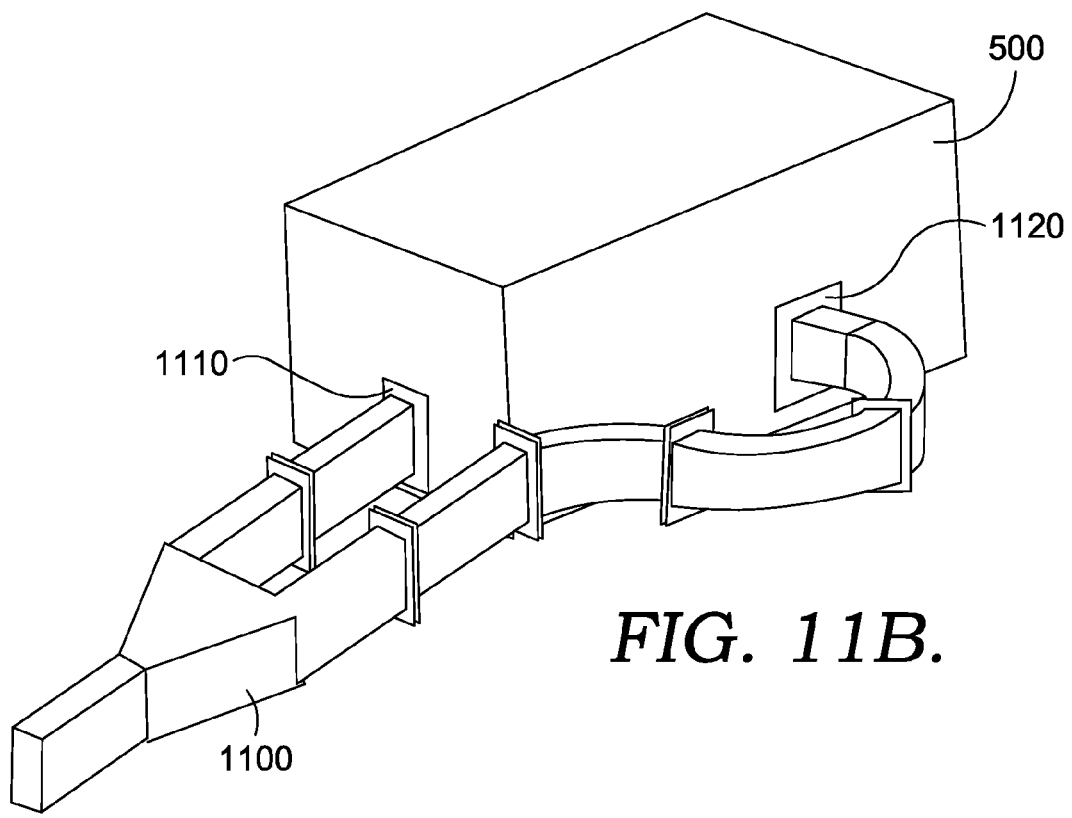
FIG. 11B is a schematic diagram of a splitter as used in various aspects of the present invention.

Energy distribution may be customized using a splitter to split an amount of energy received at a port. FIG. 11A shows a splitter 1100 which may be used to distribute energy in two or more locations within a chamber. For instance, as shown in FIG. 11B, ports 1110 and 1120 are provided into chamber 500 such as ports 1110 and 1120 may be attached to one splitter 1100, splitter 1100.

Figure 12A:
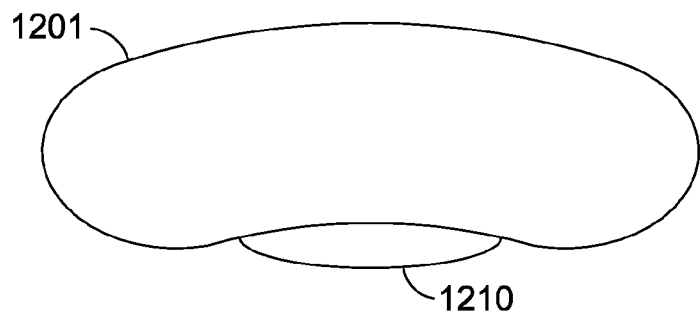
FIG. 12A is a schematic diagram of a deflector as used in various aspects of the present invention.
Figure 12B:
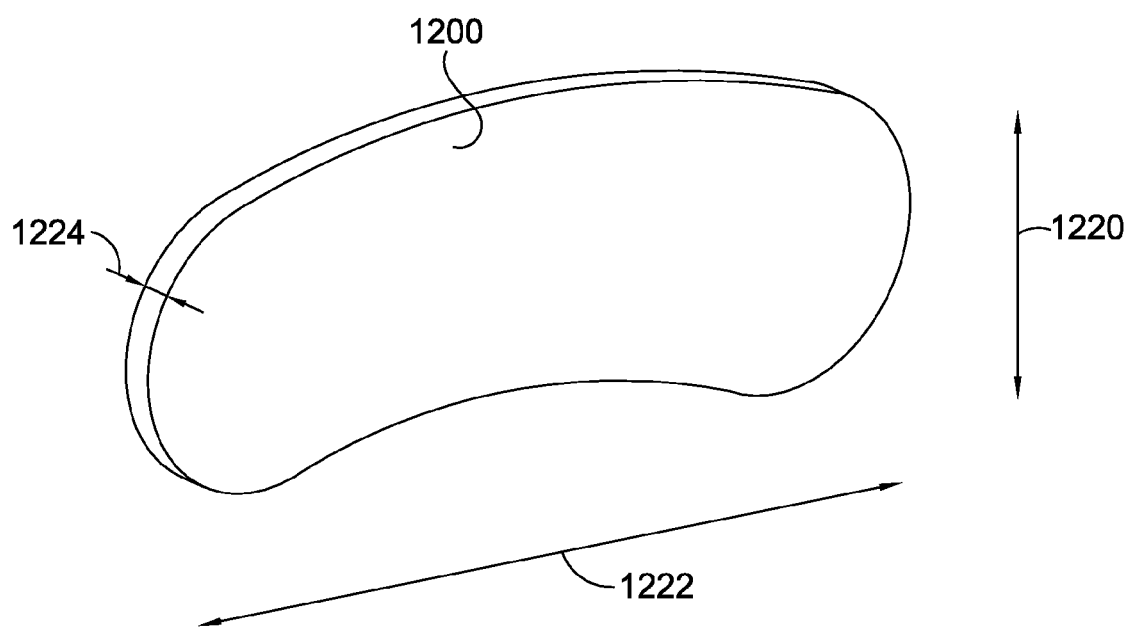
FIG. 12B is a perspective view of a deflector as used in various aspects of the present invention.

Aspects of the present invention have deflectors positioned within a chamber, such as chamber 500. A deflector is a component placed within a chamber to shape energy lobes and customize energy distribution. Generally, a deflector reflects microwave energy. A deflector may be formed of a conducting material, may have various shapes, and may be formed from continuous or non-continuous (for example, perforated or slotted) material. A deflector may be of various materials such a steel, copper, and titanium. FIG. 12A shows an exemplary deflector 1201 with an arc 1210. The arc 1210 of deflector 1200 may range from 0 to 180 degrees. FIG. 12b provides a perspective view of deflector 1200 showing a height of 1220, a length of 1222, and a width of 1224. The height 1220, may range from ⅛ to ¾ a height of a corresponding chamber. The length, 1222, may range from ⅛ to ¾ a length of a corresponding chamber, and width 1224 may range from, may range from ⅛ to ¾ a length of a corresponding chamber.

A deflector may be placed at any location within the chamber. Additionally, a deflector may be placed at an angle ranging from 0 to 90 degrees from the plane of the bottom portion 504, top portion 502, or any side portions 501, 503, 505, and 506 of the chamber 500. As shown previously in FIG. 4, a deflector 430 may be placed between a load 404 and a port 401. In some aspects, deflector 430 is placed within one wavelength of port 401. Generally, the most intense and highest energy lobes are located within one to two wavelength of the port. The area nearest to the port with the most intense energy may be referred to as the nearfield and is often considered to be within two wavelengths of the port. Placing a deflector within one wavelength of a port allows the strongest lobes of energy to be directed around the deflector. Additionally, placing the deflector within one wave length of the port positions the deflector between the workload and the port preventing a blow torch effect from happening to the workload.

Figure 13A:
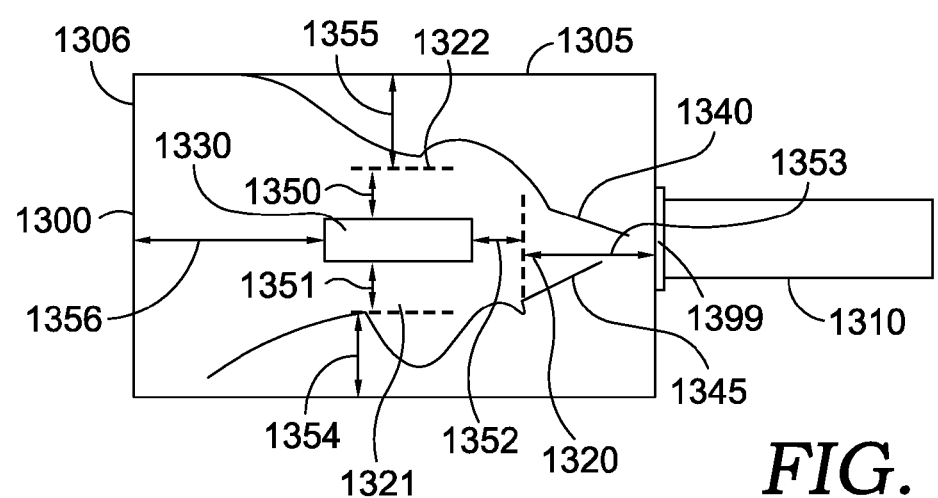
FIG. 13A is a schematic diagram of energy distribution as described in relation to various aspects of the present invention.
Figure 13B:
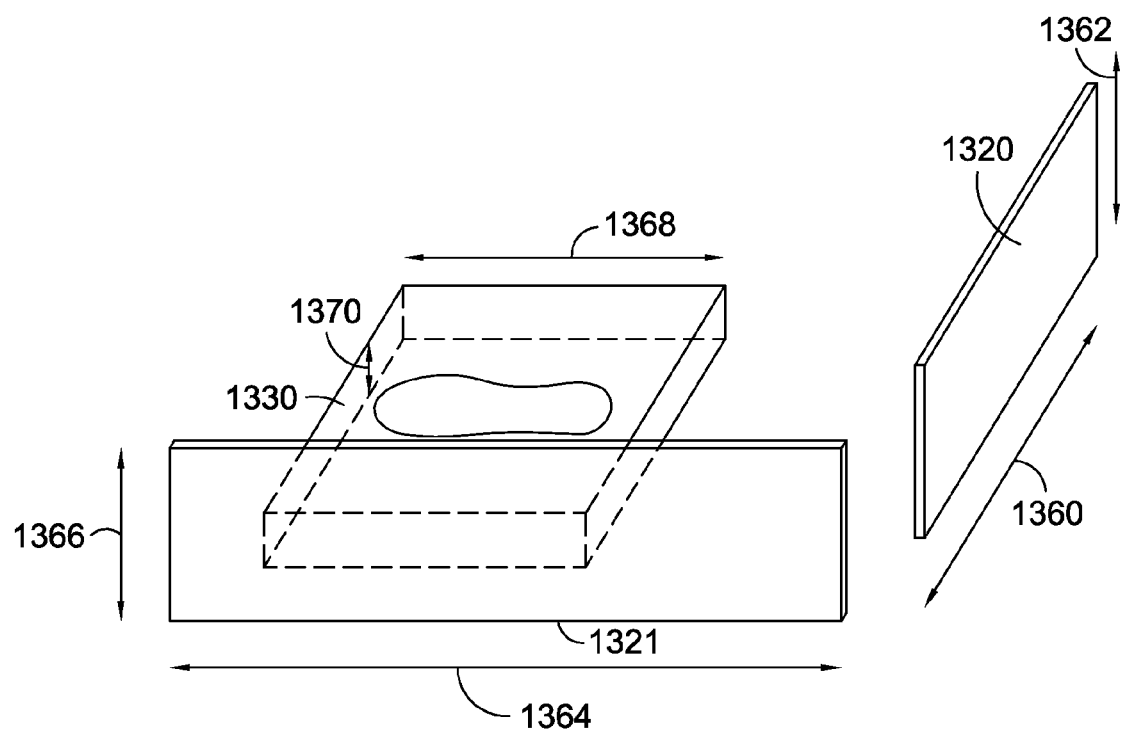
FIG. 13B is a schematic diagram of a chamber housing a load in relation to various aspects of the present invention.

In aspects that have more than one port, a deflector may be placed between each port and the load. Additionally, deflectors may be placed with a specified distance from a load. As shown in FIG. 13A, a chamber 1300 may be attached a waveguide 1310 with a port 1399 and house a load 1330 and deflector 1320, and distribution plates 1321 and 1322. Deflector 1320 is located between port 1310 and load 1330. Distribution plates 1321 and 1322 are placed at a specified distance 1350 and 1351, respectively, from the load 1330 and not between the port 1310 and the load 1330. Additionally, load 1330 and deflector 1320 may be separated by distance 1352, and port 1310 and deflector 1320 may be separated by a distance 1353. Distribution plate 1322 and a side portion 1305 may be separated by a distance 1355. Load 1330 and side portion 1356 may be separated by a distance 1356. Distribution plate 1321 and side portion 1307 may be separated by a distance 1354. A specified distance, such as specified distances 1350 to 1356, may be between zero and ½ a width or a length of chamber 1300. FIG. 13A shows an energy distribution 1340 and 1345 shaped and customized by deflectors 1320, 1321, and 1322. FIG. 13B shows a deflector 1320 and distribution plate 1321 next to a load 1330. Deflector 1320 comprises a length 1360 and a height 1362. Distribution plate may have a length 1364 and a height 1366. The load 1330 may have a length 1368 and a height 1370. The lengths, widths, and/or heights 1360, 1362, 1364, 1366, 1368 and 1370 may be between zero and ¾ a width or a length of chamber 1300. In some aspects, heights 1362 of deflector 1320 and 1366 of distribution plate 1330 may be greater than or equal to height 1370 of load 1330. Additionally, in some aspects, lengths 1360 of deflector 1320 and 1364 of distribution plate 1330 may be greater than or equal to length 1368 of load 1330. Further, height 1362 of deflector 1320 may be different from or equal to height 1366 of distribution plate 1330 and length 1360 of deflector 1320 may be different from or equal to length 1364 of distribution plate 1330.

Figure 13C:
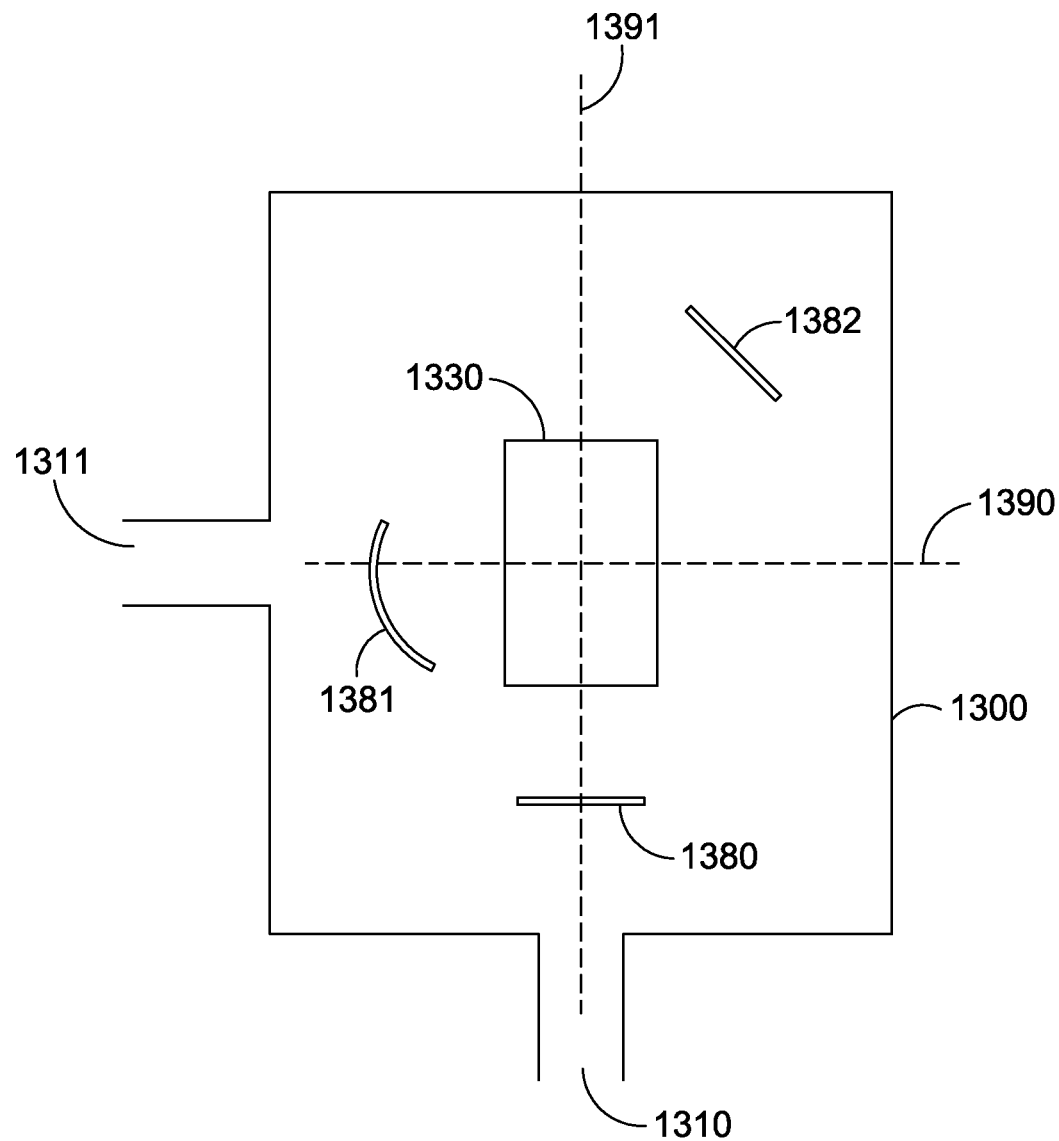
FIG. 13C is a schematic diagram of a chamber housing a load in relation to various aspects of the present invention.

FIG. 13C shows a chamber 1300 comprising ports 1310 and 1311, deflectors 1380 and 1381, a distribution plate 1382, and a load 1330. For illustration purposes dotted lines 1390 and 1391 are shown between port 1311 and load 1330. Line 1390 runs from port 1311 through the load 1330. Line 1391 runs from port 1310 through the load 1330. Deflector 1380 is located on line 1391 and between port 1310 and load 1330. By deflector 1380 being located on line 1391 between the port 1310 and 1330, the deflector prevents the load 1330 from directly receiving microwave energy directly from the port 1310. Similarly, by deflector 1381 being on line 1390 and between port 1311 and load 1330, deflector 1381 prevents the load 1330 from directly receiving microwave energy from port 1311. As shown, distribution plate 1382 is not located on either of lines 1390 or 1391. Distribution plate 1382 allows for energy within the chamber 1300 to be shaped around the load 1330.

Aspects of the present invention have distribution plates. A distribution plate facilitates a flow of energy. Using FIG. 5 as a reference, a distribution plate may be placed on the bottom portion 504, top portion 502, or side portions 501, 503, 505, or 506 of chamber 500. Additionally, a distribution plate may be placed at an angle ranging from 0 to 90 degrees from the plane of the bottom portion 504, top portion 502, or any side portions 501, 503, 505, and 506 of the chamber 500. In relation to a load, a distribution plate may be placed above and below a load to provide customized energy distribution.

Energy transfer to a load may be performed using materials that are dielectric materials and composites made of dielectric materials. Dielectric materials are electrical insulates and do not have free electron conductivity. Dielectric materials inside the multiport chamber may be relatively microwave transparent. The temperatures and the pressures required by the curing process are transferred to the workload using dielectric materials. Dielectric materials are a class of materials that have relatively poor thermal conductivity. The poor thermal conductivity of dielectric materials allow for the transfer of pressure to the workload. It is advantageous for the chamber to be as small as possible in order to minimize the total amount of dielectric material to be heated and cooled.

In aspects of the invention, to obtain uniform volumetric heating of a load, the materials immediately surrounding the load may also heat in response to the applied microwave energy to further heat the load via conduction. The dielectric properties and the mass of the load will dictate at what temperature surrounding materials should start at and should allow more uniform volumetric temperature rise in a uniform field. The surrounding material can be inheritantly lossy, such as ETFE, or can be a relatively low loss base polymer compounded with additives to achieve the correct properties, such as silicones (across entire modulus range), polyimides, LCP, fluorocarbon based materials, compounded with lossy solid materials such as high temperature hydrates (Mg (OH)2, Al (OH)3, or SiC, etc. Any structural material not in contact with a load may be low loss and low dielectric constant and high thermal conductivity to allow uniform propagation and heat transfer.

Slotted Waveguide

Systems in accordance with the present invention may use a slotted waveguide to deliver microwave energy into a chamber. Aspects of a slotted waveguide facilitate a customization of energy distribution to accommodate various load characteristics using multiple slots where microwave energy is picked up and transmitted into a chamber using slots within the slotted waveguide. In effect, the multiple slots become multiple ports, distributing energy into a chamber. In some aspects, the multiple slots surround a load and transmit uniformly over time. Any variable frequency microwave generator may be used in systems in accordance with the present invention. For example, a variable frequency microwave (VFM) generator producing 4096 sequential frequencies all with different standing wave patterns in the slotted waveguide may be used. In some aspects, the microwave frequency may range from 5850 MHz to 6650 MHz. Each pickup position of a slot and the geometry of the slot in such an example will affect the microwave transmission of other slots. Tuning of a port and the slotted waveguide configurations allows for uniform temperature rise within the chamber to be achieved, or other temperature distributions as desired or needed for a particular load. All ports may radiate differently, but over time an average energy distribution may be achieved. The nearfield 'blowtorch' effect is mitigated by distribution of the same amount of energy over several points, and/or several slots. In some aspects, none of the slots have enough energy to cause a 'blowtorch' effect in a load. If needed or desired, however, deflectors, distribution plates, and the like, in accordance with the present invention may be positioned to mitigate any blowtorch effect and/or to otherwise distribute microwave energy in a desired pattern. Additionally, in some aspects, energy coming into the cavity propagates from a conducting rod and has fundamentally different lobe patterns, all at intensity and temperature levels lower than the intensity and temperature levels of the energy in the nearfield of the port.

Figure 14A:
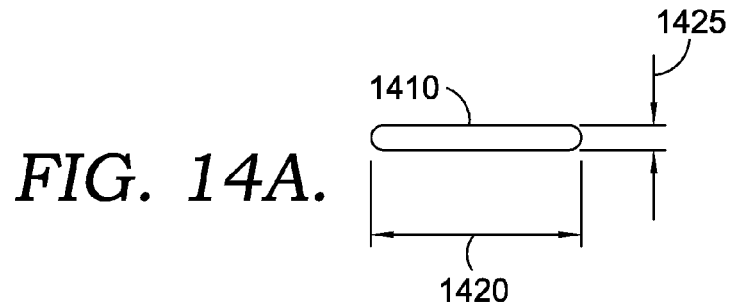
FIG. 14A is a schematic diagram of a slot as used in various aspects of the present invention.
Figure 14B:
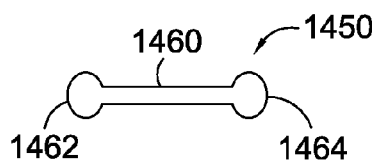
FIG. 14B is a schematic diagram of a slot as used in various aspects of the present invention.

FIG. 14A shows a slot 1410 that may be provided in a slotted waveguide system in accordance with the present invention. The length 1420 of slot 1410 may vary from, for example, approximately ⅛ a wavelength to 1 wavelength. The height 1425 of slot 1410 may vary from, for example, ⅛ wavelength to 1 wavelength. FIG. 14B shows a modified slot 1450 that may be used in a modified slotted waveguide system in accordance with the present invention. Modified slot 1450 have a height and width similar to slot 1410. Further, modified slot 1450 may have regions 1460, 1462, and 1464 where the width of regions 1462 and 1464 are greater than the width of region 1460 forming a "dogbone" shape that may alter microwave energy distribution patterns and, as further described below, may permit one or more conducting rods to be retained by modified slot 1450.

Figure 15:
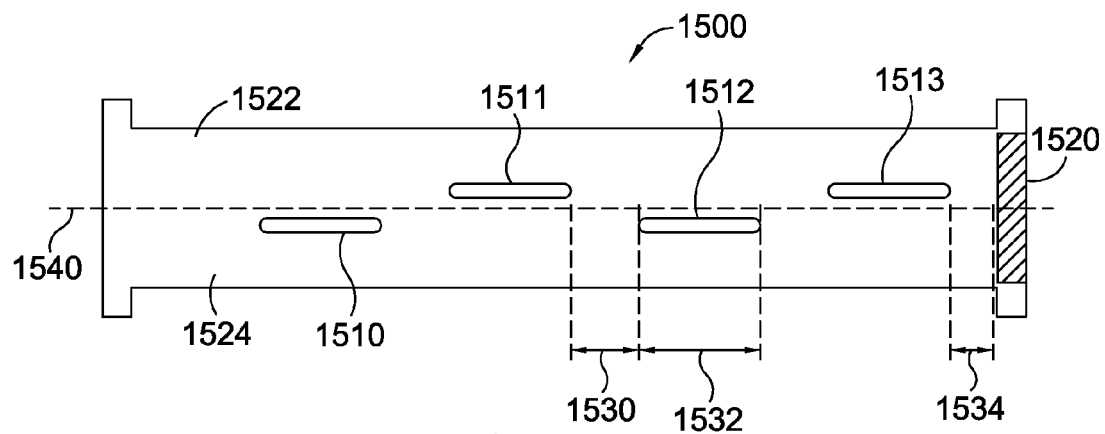
FIG. 15 is a schematic diagram of a slotted waveguide as used in various aspects of the present invention.

FIG. 15 shows an exemplary slotted waveguide 1500 has slots 1510, 1511, 1512, and 1513. Slots 1510, 1511, 1512, and 1513 are similar to slot 1410 and are distributed above and below a median 1540. The distance between each slot 1530 may vary from, for example, about ⅛ a wavelength to 1 wavelength. The length of a slot, such as slot 1512, may also vary from, for example, ⅛ a wavelength to 1 wavelength. Additionally, the distance 1534 between the end of a waveguide 1520 and an initial slot, such as slot 1513, may vary, for example, between about ⅛ wavelength and 1 wavelength and multiples thereof. In some aspects, the distance 1534 is a quarter wavelength from the end of the waveguide 1520.

Figure 16:
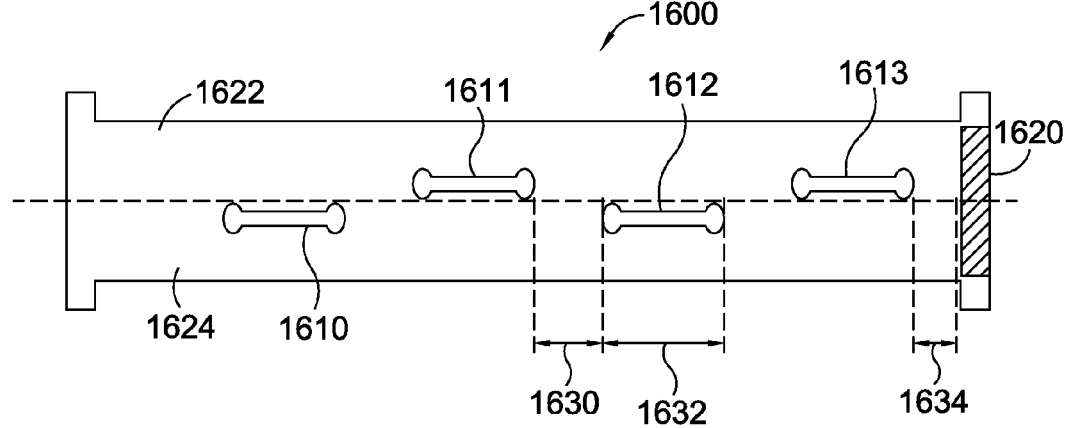
FIG. 16 is a schematic diagram of a slotted waveguide as used in various aspects of the present invention.

FIG. 16 shows an exemplary slotted waveguide 1600 with slots 1610, 1611, 1612, and 1613. Slots 1610, 1611, 1612, and 1613 are similar to slot 1450 and are distributed above and below a median 1640. The distance between each slot 1630 may vary from, for example, about ⅛ wavelength to 1 wavelength. The length of a slot, such as slot 1612, may also vary from ⅛ wavelength to 1 wavelength. Additionally, distance 1634 between the end of a waveguide 1620 and an initial slot, such as slot 1613, may vary, for example, between about ⅛ wavelength and 1 wavelength and multiples thereof. In some aspects, distance 1634 is a quarter wavelength from the end of the waveguide 1620.

Figure 17:
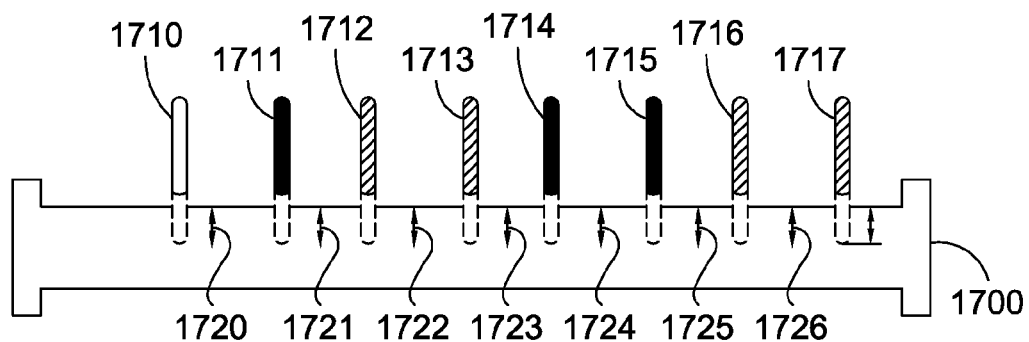
FIG. 17 is a schematic diagram of a slotted waveguide as used in various aspects of the present invention.

In some aspects single and/or doublet conducting rods, and/or multiples thereof are placed in the slots of a slotted waveguide. FIG. 17 shows a waveguide 1700 comprising conducting rods 1710, 1711, 1712, 1713, 1714, 1715, 1716, 1717. Conducting rods 1710 to 1717 may be placed a specified distance into waveguide 1700, as shown at 1720, 1721, 1722, 1723, 1724, 1725, 1726, and 1727, respectively.

In some aspects, a doublet conducting rod may be placed in slots of waveguide 1500 and/or 1600. In some aspects comprising doublet conducting rods, the doublet conducting rods may be placed above or below line 1540 and/or 1640. For instance, if doublet conducting rods are placed in slots 1611 and 1613 of waveguide 1600, then optionally no conducting rods may be placed in slots 1610 and 1632. Further, slots 1610 and 1632 may be omitted from waveguide 1600 or may be covered utilizing metallic tape so that no energy is delivered through slots 1610 and 1632. In other aspects, single conducting rods may be placed both above and below line 1540 and/or 1640 at the same time. In certain aspects, if slots above and below a line, such as line 1540, are populated with doublet conducting rods, then the microwave energy reflected back into waveguide 1600 rather than transmitted into the chamber becomes excessively high and the load receives less energy. In certain aspects, a distance between each slot, such as distance 1630, may be between a half and a quarter wavelength.

Figure 18A:
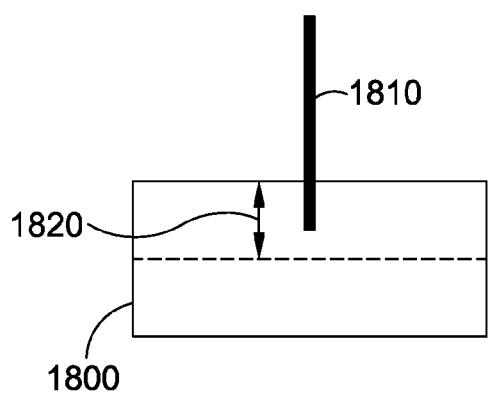
FIG. 18A is a schematic diagram of a conducting rod as used in various aspects of the present invention.
Figure 18B:
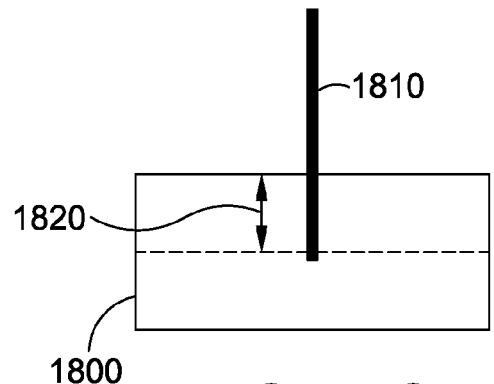
FIG. 18B is a schematic diagram of a conducting rod as used in various aspects of the present invention.
Figure 18C:
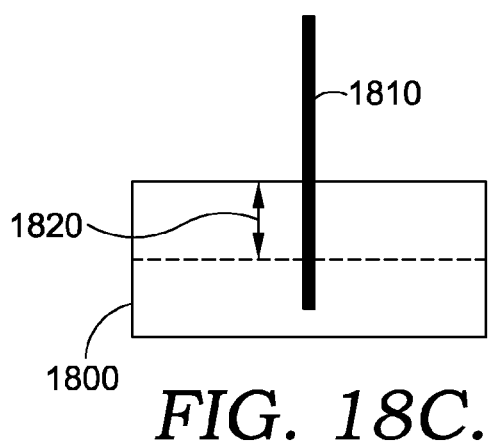
FIG. 18C is a schematic diagram of a conducting rod as used in various aspects of the present invention.

A port may be tuned by varying the depth of a conducting rod in a waveguide, as shown in FIGS. 18A, 18B, and 18C. Each of FIGS. 18A-C show a slotted waveguide 1800 with conducting rod 1810. FIG. 18A shows a conducting rod placed into a slot at a depth 1820 less than a quarter of a wavelength. FIG. 18B shows a conducting rod placed into a slot at a depth 1820 equal to a quarter of a wavelength. FIG. 18C shows a conducting rod placed into a slot at a depth 1820 greater than a quarter of a wavelength. Varying the depth of the conducting rods allows for energy distribution within a chamber to be customized, as a depth less than a quarter of a wavelength is capacitive, a depth equal to a quarter of a wavelength is resistive, and a depth greater than a quarter of a wavelength is inductive.

In some aspects, a port may be tuned by frequency band feasibility using individual slot and conducting rod configurations in order to maximize energy at multiple smaller frequency bands. In one aspect, an efficient band may be created using 6150 GHz+/−100 MHz. Because ports may be tuned by varying standing wave patterns within the waveguide, a control algorithm may be developed to average the energy delivered from all of the ports surrounding the load. A map of energy delivered by port by frequency band (a portion of the total available variable frequency band) as a function of tuning piston position can be leveraged to choose favorable piston position, partial frequency band (of total available variable frequency band), power, and time power is delivered to enable particular power distribution from all the ports. Many of these particular conditions may be programmed in series to create controllable, customizable energy distribution within the chamber containing the load over the heating cycle. As a result, a more uniform temperature may be obtained within the total volume of the irregular load.

In some aspects, energy distribution may be customized by switching between single and double conducting rods at various frequencies. Switching between a single and double conducting rod allow for high efficient wave propagation into a chamber.

Figure 19:
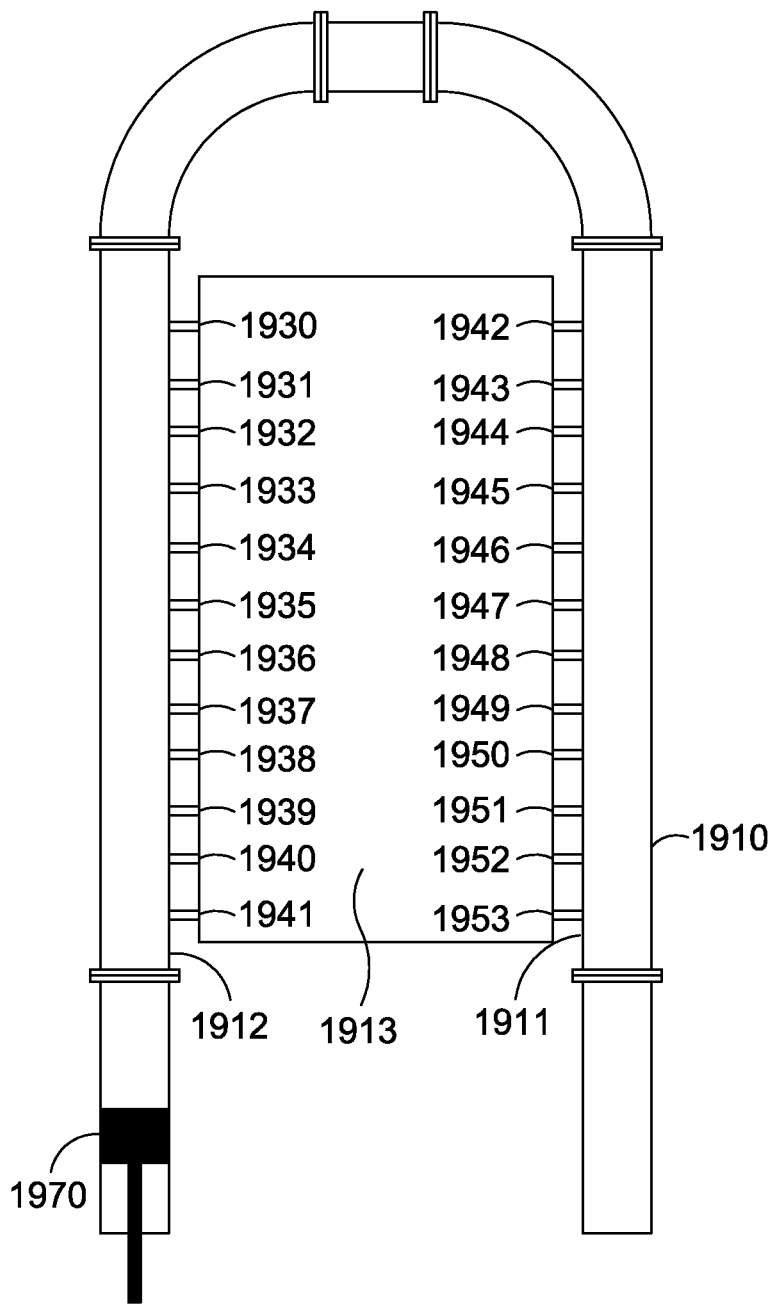
FIG. 19 is a schematic diagram of a chamber as used in various aspects of the present invention.
Figure 20:
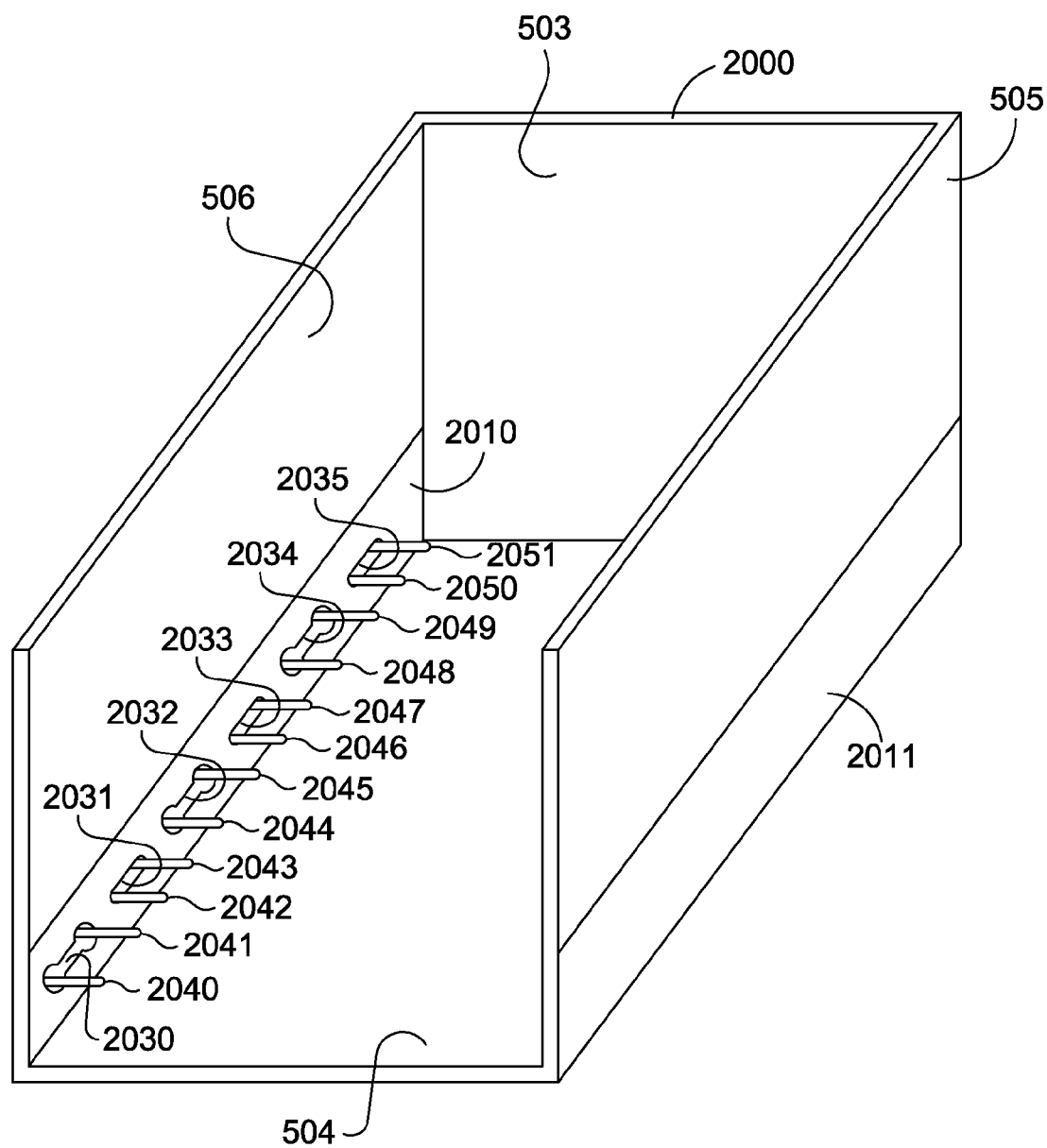
FIG. 20 is a schematic diagram of a chamber as used in various aspects of the present invention.

FIG. 19 shows slotted waveguides 1911 and 1912 that form a first chamber 1910 with a second chamber 1913, where the first chamber 1910 formed by the waveguides 1911 and 1912 is larger than the second chamber 1913. Chamber 1910 terminates on one end with a piston 1970, which may be adjusted to alter the energy distribution within chamber 1910. Slotted waveguide 1911 has conducting rods 1942, 1943, 1944, 1945, 1946, 1947, 1948, 1949, 1950, 1951, 1952, and 1953. Slotted waveguide 1912 has conducting rods 1930, 1931, 1932, 1933, 1934, 1935, 1936, 1937, 1938, 1939, 1940, and 1941. In some aspects, chamber 1913 has windows that allow conducting rods 1930-1953 to be inserted into the chamber, as further described in FIG. 20. FIG. 20 shows a chamber 2000, similar to chamber 500. Chamber 2000 has windows 2010 and 2011 in side portions 506 and 505, respectively. Slotted waveguide 2020 may be placed next to or in a window, such as window 2010. Slotted waveguide 2020 has slots 2030, 2031, 2032, 2033, 2034, and 2035 which are similar to 1410 and 1450 and have conducting rods 2040, 2041, 2042, 2043, 2044, 2045, 204, 2047, 2048, 2049, 2050, and 2051. A window, such as window 2011, may be placed along a top portion 502, bottom portion 504, or side portions 501, 503, 505, and 506.

In additional aspects, dielectric materials with dielectric constants ranging from one to infinity may be placed within one wavelength of the ports, waveguide and/or conducting rods. In one aspect, a dielectric constant of materials of a chamber may be higher than the dielectric constant for a conducting rod. Further, the dielectric constant for a dielectric material comprising a cavity within a chamber may be higher than the dielectric constant of materials of a chamber. Additionally, the dielectric constant of the load may be higher than the dielectric constants for the conducting rod, the chamber and higher than or equal to the dielectric constant for the dielectric material comprising a cavity. In one aspect, conducting rods and windows are surrounded by aluminum to carry currents into the second chamber.

A port may be tuned using a variable position shorting piston past the last port. This changes the standing wave pattern within the waveguide and allows individual frequency wave fronts to couple with different conducting rods. A change in the standing wave pattern may also be obtained by changing the waveguide distance before the first conducting rod and slot. Additional techniques, such as variable stub tuning and on line tuning techniques using adjustable short positions within legs of a magic tee.

Features and subcombinations are of utility and may be employed without reference to other features and subcombinations of the slotted waveguide. Additional applications of a slotted waveguide beyond the application to a shoe sole may be possible and obvious to one skilled in the art.

Cage

A further example of a system in accordance with the present invention may be referred to as a cage. A cage may comprise a chamber formed from walls of a conducting material with openings permitting microwave energy to enter the interior of the chamber. Aspects of a cage facilitates a customization of energy distribution to accommodate various load characteristics using a plurality of openings where microwave energy is picked up and transmitted into a chamber using plurality of openings through the perimeter walls of the chamber.

Figure 21A:
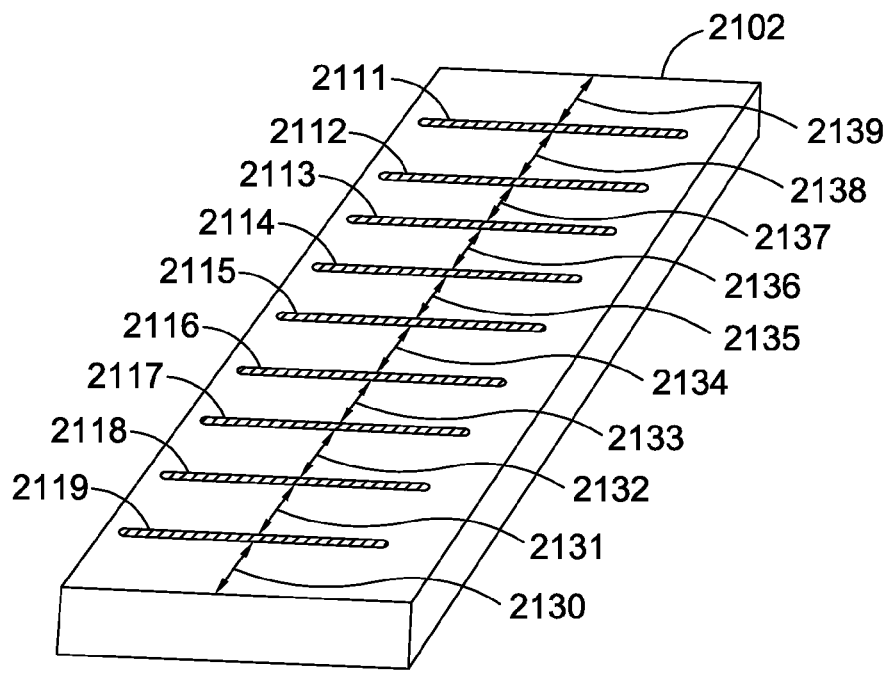
FIG. 21A is a perspective view of a top portion of a container as used in various aspects of the present invention.
Figure 21B:
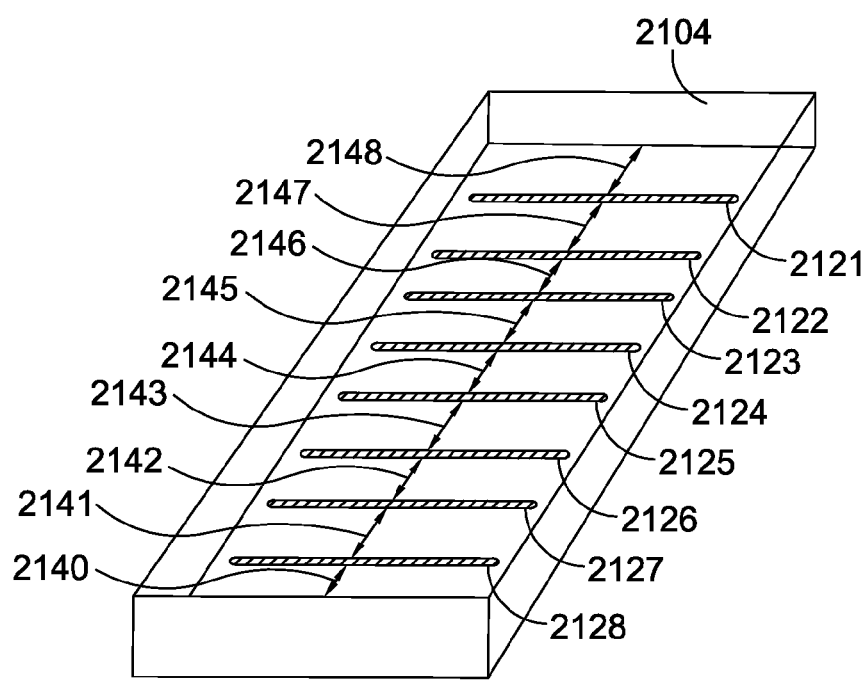
FIG. 21B is a perspective view of a bottom portion of a container as used in various aspects of the present invention.

A chamber may be similar to chamber 500 having 9 top panel 502, bottom panel 504, and side panels 501, 503, 505, and 506 made of conducting material(s), at least in part. The top panel, bottom panel, and side panels, which may also be referred to as perimeter walls, may be formed of conducting materials. One or more of the panels may have a plurality of openings that allow microwave energy to enter the interior volume of the chamber. FIGS. 21a and 21b show an exemplary top portion 2102 and bottom portion 2104 of a chamber with plurality of openings 2111, 2112, 2113, 2114, 2115, 2116, 2117, 2118, and 2119 in top portion 502 and plurality of openings 2121, 2122, 2123, 2124, 2125, 2126, 2127, and 2128 in bottom portion 504. A chamber may comprise a retention mechanism that may be engaged to secure the top panel 502, bottom panel 504, and side panels 501, 503, 505, and 506 to retain a dielectric, cavity and load at a predetermined pressure.

In the present examples, chambers are described using walls having sufficient thickness to provide structural integrity for the overall system. In some examples, however, one or more dielectrics selected for use may have sufficient rigidity to provide sufficient structural integrity for the system. In such an example, conducting walls (or panels) may be very thin and/or may provide otherwise unattainable patterns. For example, the panels in such an example may comprise conducting tape, a conducting film, an application of conducting nanoparticles, etc.

Figure 21C:
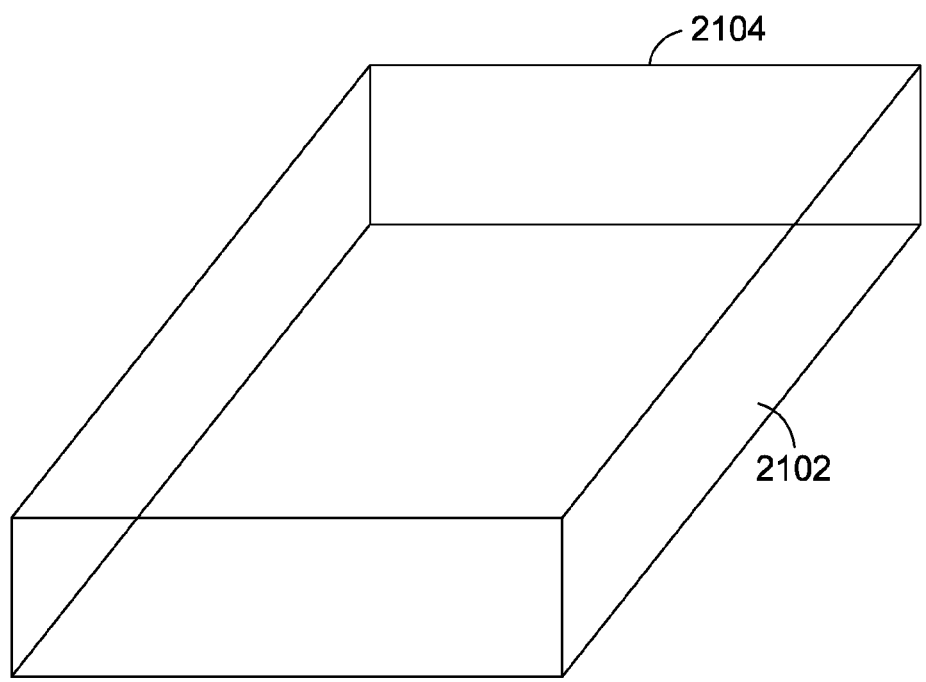
FIG. 21C is a perspective view of a bottom portion of a container as used in various aspects of the present invention.
Figure 21D:
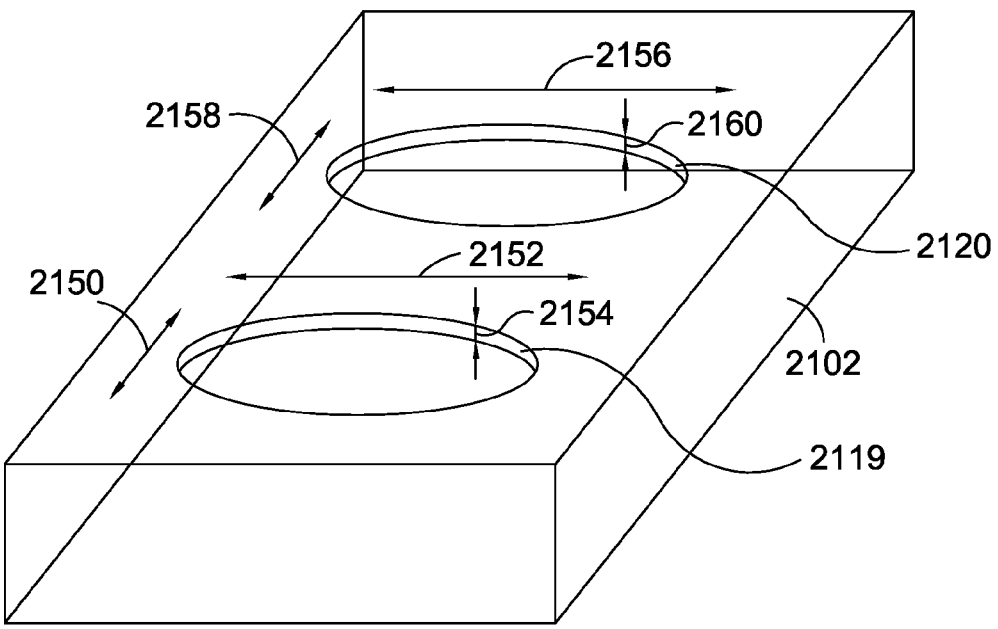
FIG. 21D is a perspective view of a top portion of a container as used in various aspects of the present invention.

Distances 2130, 2131, 2132, 2133, 2134, 2135, 2136, 2137, 2138, 2139 between the openings 2111-2119 located on top portion 2101 may vary from one another, and may vary from distances 2121, 2122, 2123, 2124, 2125, 2126, 2127, and 2128 between openings 2140-2148 located on bottom portion 2104, such that the openings of top portion 2102 and bottom portion 2104 may align with one another or be offset from one another. Additionally, as shown in FIG. 21C, a bottom portion 2104 may contain no openings. FIG. 21D illustrates two openings of 2102 showing openings 2119 and 2120. Opening 2119 has a height of 2154, a width of 2150 and a length of 2152. Opening 2120 has a height of 2160, a width of 2158, and a length of 2156. Each of 2154, 2150, 2152, 2158, 2160, 2156 may measure from about ⅟32 to ¾ of a height, width, or length of a top portion 2102. Additionally, each of 2154, 2150, 2152, 2158, 2160, 2156 may comprise equal or different measurements from one another. Additionally, a opening may have a full length and/or a full width equal to a length and/or width of a portion of a chamber.

Figure 21E:
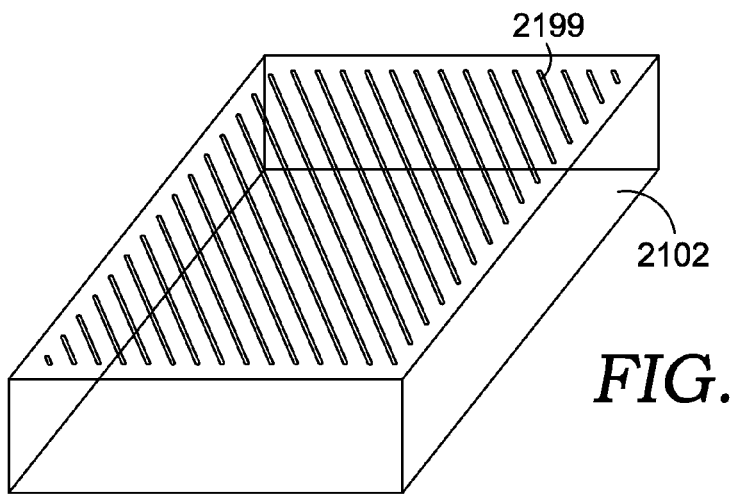
FIG. 21E is a perspective view of a top portion of a container as used in various aspects of the present invention.
Figure 21F:
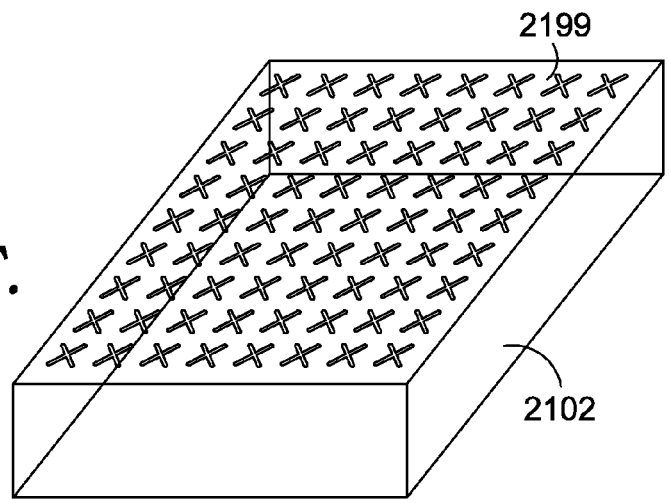
FIG. 21F is a perspective view of a top portion of a container as used in various aspects of the present invention.
Figure 21G:
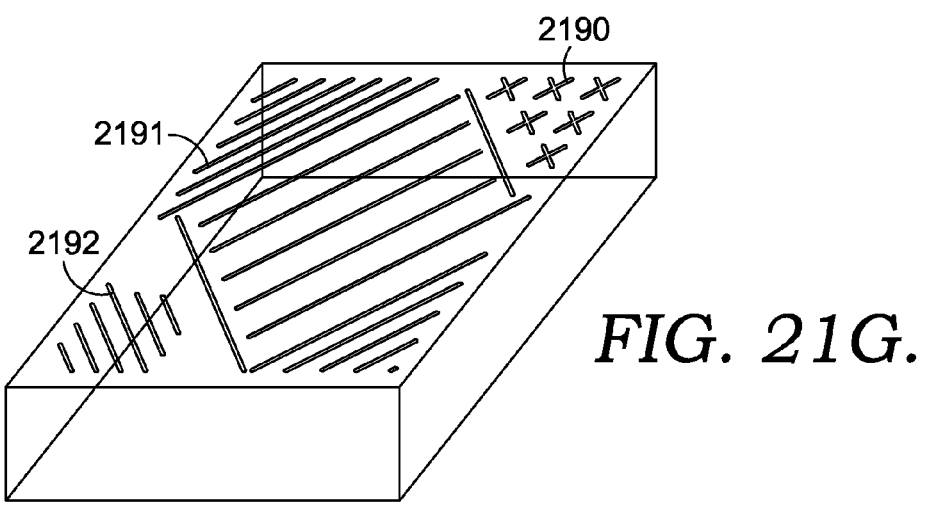
FIG. 21G is a perspective view of a top portion of a container as used in various aspects of the present invention.

Additionally, FIGS. 21E-G illustrates various configurations of openings that may be comprised within portions of a chamber. FIG. 21E illustrates openings 2199 at an diagonal angle in top portion 2102. FIG. 21F illustrated openings 2199 in a crosshatch patter in top portion 2102. FIG. 21G illustrates a top portion 2102 comprising openings at various orientations. For instance, openings 2190 are of a crosshatch design, openings 2191 are at a first angle and openings 2192 are at a second angle.

Figure 22A:
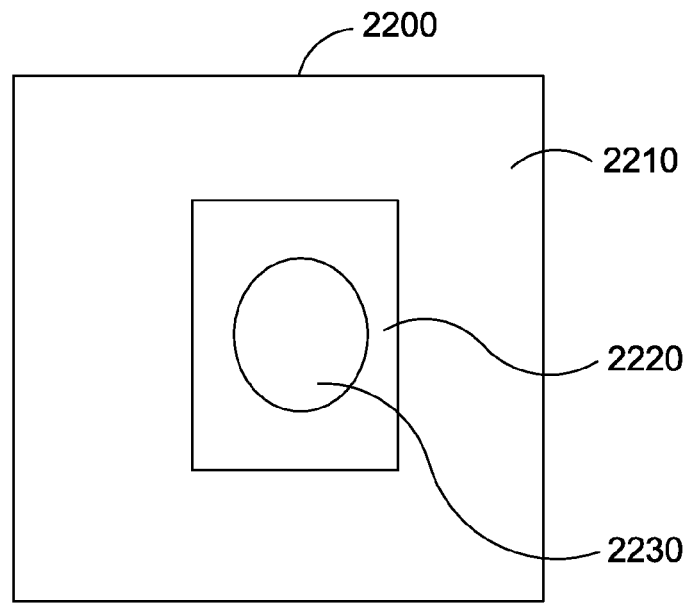
FIG. 22A is a schematic diagram of a chamber comprising a load as used in various aspects of the present invention.
Figure 22B:
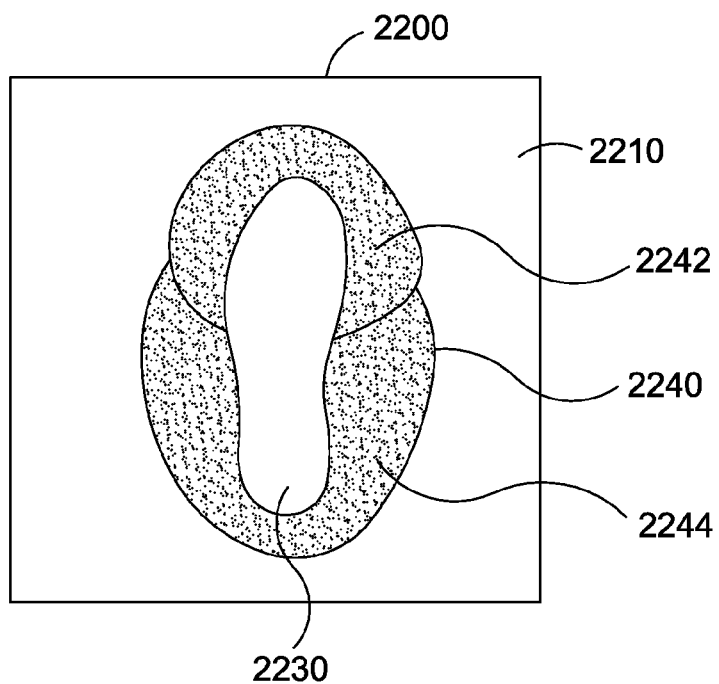
FIG. 22B is a schematic diagram of a chamber comprising a load as used in various aspects of the present invention.

FIGS. 22A and 22B illustrate aspects of the present invention concerning a variety of shapes of a dielectric material comprising a cavity. FIG. 22 comprises a chamber 2210 housing a dielectric material 2220 comprising a cavity 2230. Dielectric material 2220 may be fairly uniform in shape and may comprise dielectric material of the same dielectric constant. FIG. 22B comprises a chamber 2210 housing dielectric material 2240 forming a cavity 2230. Dielectric material 2240 is not uniform in shape. Dielectric material 2240 may comprise a first dielectric material 2242 and a second dielectric material 2244. First dielectric material 2242 may have a dielectric constant different from that of second dielectric material 2244.

Utilizing the chamber, the assembled chamber may be placed in an applicator chamber. The applicator chamber may be larger than the assembled chamber and large enough to maintain standing wave and/or may be a continuous feed microwave oven. Microwave energy within the applicator chamber may enter the chamber through openings of the chamber.

An opening within a chamber may be of a variety of shapes and sizes. An opening may be oval, round, and rectangular. An opening may be 1/32 to 1/2 a length of a top portion, bottom portion, or side portion of a chamber. Additionally, plurality of openings may be evenly or unevenly spaced 1/32 to 1/2 a length of a top portion, bottom portion, or side portion of a chamber. An opening may be oriented at angled zero to 180 degrees against an energy field.

A plurality of openings within a top panel may be aligned with a plurality of openings within a bottom panel. In some aspects, the plurality of openings in the top panel may be offset by a distance of 1 wavelength or multiples thereof. The each of the plurality of openings may be parallel to one another or at various angles to one another. An opening may have a first portion located at a first surface facing away from an interior of the chamber and a second portion located at a second surface facing into an interior of the chamber. A width of the first portion of the opening may be greater than, equal to, or less than a width of the second portion of the opening. The first portion of the opening may be aligned with the second portion of the opening. Alternatively, the first portion of the opening may be offset from the second portion of the opening by a distance up to 1 wavelength.

Aspects of a chamber have dielectric material comprising a cavity that may retain a load. The dielectric material comprising a cavity may be made of material with a dielectric constant ranging from one to infinity. The cavity may be used to retain a load, such as a molded part and materials associated with a shoe sole.

In some aspects, an opening may be partially or entirely filled with dielectric material in order to make the opening electrically larger and allow more energy to enter the interior of the chamber via the opening. As described above, microwave energy moves from a low dielectric to a high dielectric constant material. By adding dielectric material to an opening, energy may be configured to move into the opening and into the chamber in a desired fashion. Multiple types of dielectric materials with different dielectric constants may be placed in a single opening. For instance, a dielectric constant of a portion of material near the outside of an opening may be less than a dielectric constant of a portion of material near the inside of an opening.

In some aspects a cage may be well suited for curing a load within an applicator chamber having a standing wave pattern. In some aspects, a cage may be placed within a nearfield of an applicator chamber. In other aspects energy may be introduced within the applicator chamber and the chamber at different polarizations. Additionally, in some aspects conducting rods may be added to openings of a chamber in order to effectively force energy into the chamber. An introduction of conducting rods into openings of a chamber may comprise features similar to the features and aspects described in relation to the slotted waveguide.

Process for Affixing EVA to Rubber

Utilizing aspects of the present invention discussed above, an EVA item may be affixed to a rubber item. As will be described further below, at least one advantage of utilizing aspects of the present invention to affix an EVA item to a rubber item may be that, in some aspects, adhesives and primers are not necessary to affix the EVA item to the rubber item. However, in other aspects, adhesives and primers may be used to facilitate affixing the EVA item to the rubber item.

Figure 23:
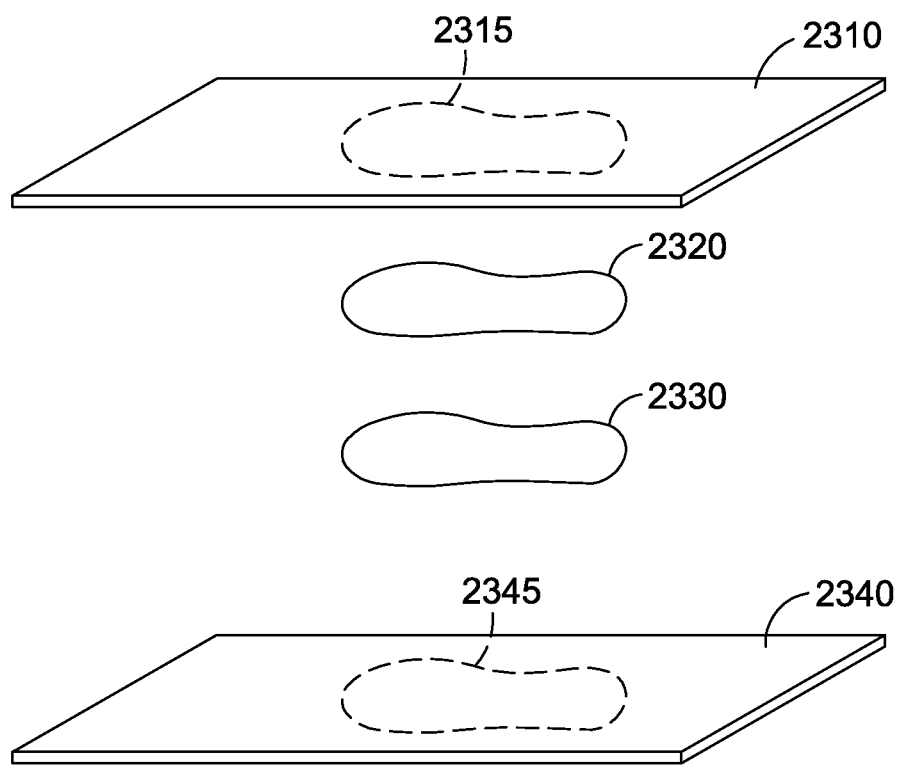
FIG. 23 is a schematic diagram of an EVA item and a rubber item in relation to a aspects of the present invention.

In an exemplary process of affixing an EVA item to a rubber item, as will be discussed in detail below, a rubber item and an EVA item may be each prepared utilizing aspects of the present invention or using conventional methods. The prepared EVA item may placed in contact with, for example on top of, the prepared rubber item within a cavity formed in at least a first dielectric material. The dielectric material having the cavity, the prepared EVA item, and the prepared rubber item may be placed within a chamber. Pressure may be applied to the EVA item and the rubber item to bring them into intimate contact. Microwaves may be applied to the chamber causing the EVA item and the rubber item while pressure is applied. For illustration purposes, FIG. 23 illustrates a top portion 2315 of a dielectric material with a top portion 2315 of cavity extending therein, a bottom portion 2345 of a dielectric material with a bottom portion 2345 of the cavity extending therein, with an EVA material 2320 and a rubber material 2330.

The cavity and the dielectric material containing the cavity used in bonding the rubber item and the EVA item may be similar to the cavity and dielectric materials described above in aspects related to the examples of the multiport launch, slotted waveguide, and/or cage examples. The dielectric material containing the cavity may be comprised of material similar to LSR, PTFE, and/or epoxy described above. The dielectric material may have a dielectric constant less than or equal to the rubber item and/or EVA item allowing heat to be transferred to the rubber item and EVA item effectively. The chamber may be configured to be able to withstand microwaves and temperatures up to 200 degrees Celsius.

The prepared EVA item may be placed onto the prepared rubber item. The prepared EVA item may be a foamed EVA or a solid EVA. The prepared rubber item may be less than fully cured, i.e. uncured or partially cured. Both the prepared rubber item and prepared EVA item may be housed within a cavity in the dielectric materials. The dielectric materials may have dielectric constants less than or equal to dielectric constants of the prepared rubber item and the prepared EVA item, although this need not be the case in all uses of systems and methods in accordance with the present invention. The dielectric material with the cavity housing both the prepared rubber item and prepared EVA item may be placed within a chamber. Optionally, the prepared EVA item, prepared rubber item, dielectric material, and/or chamber may be preheated. The chamber may have features similar to aspects of the invention described above in the examples of the multiport launch, slotted waveguide, and/or cage examples. Microwave energy and pressure may be applied to the cavity, prepared rubber item and prepared EVA item for a specified amount of time, causing the rubber item to bond to the EVA item. Additionally, in some aspects, a pressure component, such as a clamp, may be applied to the prepared EVA item and prepared rubber item such that pressure is applied to press the prepared EVA item and prepared rubber item into one another before, during, and/or after the heating process. Utilizing aspects of the present invention may allow a rubber item to bond to an EVA item without using primers or adhesives.

Figure 25:
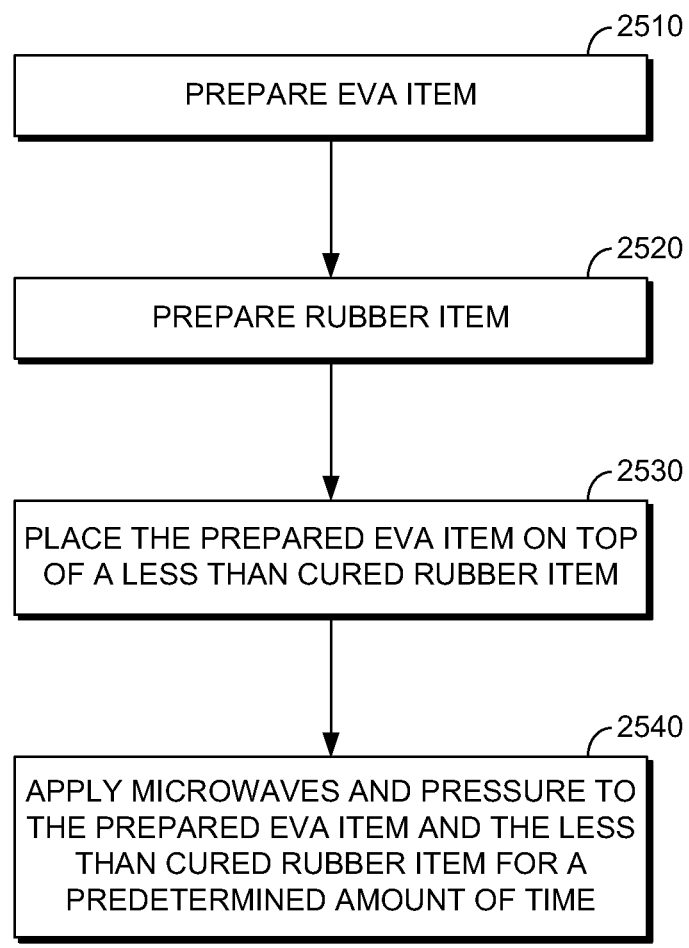
FIG. 25 is a flow of a method concerning a bonding of an EVA item to a rubber item in relation to aspects of the present invention.

FIG. 25 illustrates a method of bonding an EVA item to a rubber item. At step 2510, an EVA item may be prepared, either using conventional methods or methods described herein. At step 2520, a rubber item may be prepared using conventional methods or methods described herein. The rubber item prepared in step 2520 may be less than fully cured. In step 2530, the prepared EVA item may be placed in contact with, for example on top of, the prepared rubber item. In step 2540, microwave energy and pressure may be applied to the EVA item and the rubber item to bond them together.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made of the invention without departing from the scope thereof, it is to be understood that all matter herein set forth or shown in the accompanying drawings is to be interpreted as illustrative and not in a limiting sense.

Having thus described the invention, what is claimed is:

1. A chamber that retains a molded part for treatment with microwave energy, the chamber comprising:
    a top panel constructed of a conducting material, the top panel having a first thickness and a plurality of openings extending through the top panel, wherein at least one of the plurality of openings is entirely filled with a solid dielectric material;
    a bottom panel oriented parallel to the top panel, the bottom panel disposed at a first height from the top panel and comprising a plurality of openings;
    at least one perimeter wall that extends from the top panel to the bottom panel and encloses an interior volume within the at least one perimeter wall, the top panel, and the bottom panel when the at least one perimeter wall, the top panel, and the bottom panel are assembled;
    at least one dielectric configured to at least partially fill the interior volume within the at least one perimeter wall, the top panel, and the bottom panel when the perimeter wall, the top panel, and the bottom panel are assembled;
    at least one cavity within the at least one dielectric that may retain a molded part for treatment with microwave energy, the at least one cavity conformed to contact the dielectric to the molded part;
    wherein the assembled chamber comprising the top panel, bottom panel, the at least one perimeter wall with a retention mechanism engaged to retain the at least one dielectric and molded part retained by the cavity at a predetermined pressure, may be placed within an applicator chamber to receive microwave energy through the plurality of openings of the top panel, the applicator chamber being at least large enough to create standing waves of microwave energy; and
    wherein an edge of at least one of the plurality of openings of the top panel is vertically aligned with a corresponding edge of at least one of the plurality of openings of the bottom panel.

2. The chamber of claim 1, wherein the plurality of openings in the top panel comprise a plurality of parallel slots.

3. The chamber of claim 2, wherein each of the plurality of parallel slots has a first width at a surface of the top panel that faces away from the interior and a second width at a surface of the top panel that faces toward the interior.

4. The chamber of claim 3, wherein the first width is greater than the second width.

5. The chamber of claim 3, wherein the first width is less than the second width.

6. The chamber of claim 1, wherein the bottom panel and the at least one perimeter wall are formed from a conducting material.

7. The chamber of claim 1, wherein the plurality of openings of the top panel are offset from the plurality of openings of the bottom panel.

8. A chamber that retains a molded part for treatment with microwave energy, the chamber comprising:
    a top panel constructed of a conducting material, the top panel having a first thickness and a plurality of openings extending through the top panel, each of the plurality of openings is entirely filled with one or more solid dielectric materials;
    a bottom panel oriented parallel to the top panel, the bottom panel disposed at a first height from the top panel and comprising a plurality of openings;
    at least one perimeter wall that extends from the top panel to the bottom panel and encloses an interior volume within the at least one perimeter wall, the top panel, and the bottom panel when the at least one perimeter wall, the top panel, and the bottom panel are assembled;
    at least one dielectric configured to at least partially fill the interior volume within the at least one perimeter wall, the top panel, and the bottom panel when the perimeter wall, the top panel, and the bottom panel are assembled;
    at least one cavity within the at least one dielectric that may retain a molded part for treatment with microwave energy, the at least one cavity conformed to contact the dielectric to the molded part;
    wherein the assembled chamber comprising the top panel, the bottom panel, the at least one perimeter wall with a retention mechanism engaged to retain the at least one dielectric and the molded part retained by the cavity at a predetermined pressure, may be placed within an applicator chamber to receive microwave energy through the plurality of openings of the top panel, the applicator chamber being at least large enough to create standing waves of microwave energy; and
    wherein an edge of at least one of the plurality of openings of the top panel is vertically aligned with a corresponding edge of at least one of the plurality of openings of the bottom panel.

9. The chamber of claim 8, wherein each of the plurality of openings comprise a top portion at a surface of the top panel that faces away from the interior and a bottom portion at a surface of the top panel that faces toward the interior, the top portion being a first distance from the bottom portion.

10. The chamber of claim 9, wherein at least one of the plurality of openings is entirely filled with a first material of the one or more solid dielectric materials, and wherein at least one of the plurality of openings is entirely filled with a second material of the one or more solid dielectric materials.

11. The chamber of claim 10, wherein the first material comprises a dielectric constant less than a dielectric constant of the second material.

12. The chamber of claim 8, wherein the bottom panel and the at least one perimeter wall are formed from a conducting material.

13. The chamber of claim 12, wherein the at least one perimeter wall further comprise a plurality of openings.

14. The chamber of claim 8, wherein one or more dielectric constants of each of the one or more solid dielectric materials fully contained within each of the plurality of openings are less than the at least one dielectric.

15. The chamber of claim 8, wherein one or more dielectric constants of each of the one or more solid dielectric materials fully contained within each of the plurality of openings are less than a dielectric of the cavity.

16. The chamber of claim 8, wherein one or more dielectric constants of each of the one or more solid dielectric materials comprised by each of the plurality of openings are less than a dielectric of the molded part.

\* \* \* \* \*